United States Patent [19]

Sugimoto

[11] Patent Number: 5,437,475
[45] Date of Patent: Aug. 1, 1995

[54] SHOULDER ADJUSTER APPARATUS AND ASSEMBLING METHOD OF THE SAME

[75] Inventor: Mutsumi Sugimoto, Hamamatsu, Japan

[73] Assignee: Yugengaisha Mutsumichi Kenkyujo, Japan

[21] Appl. No.: 920,995

[22] Filed: Jul. 28, 1992

[30] Foreign Application Priority Data

Apr. 20, 1992 [JP] Japan .................. 4-099668

[51] Int. Cl.$^6$ ............................................. B60R 22/20
[52] U.S. Cl. ................... 280/801.2; 280/808
[58] Field of Search ................ 280/801, 801 A, 808; 24/519, 616

[56] References Cited

U.S. PATENT DOCUMENTS

| | | | |
|---|---|---|---|
| 4,720,147 | 1/1988 | Takada | 280/801 A |
| 4,971,359 | 11/1990 | Takahashi et al. | 280/808 |
| 5,050,907 | 9/1991 | Boumarafi et al. | 280/801 A |
| 5,066,043 | 11/1991 | Tokugawa | 280/808 |
| 5,149,136 | 9/1992 | Maekawa et al. | 280/801 A |

FOREIGN PATENT DOCUMENTS

| | | |
|---|---|---|
| 0290621 | 11/1988 | European Pat. Off. . |
| 2590215 | 5/1987 | France ........................ 280/801 A |
| 3616992 | 11/1987 | Germany . |
| 62-88641 | 10/1985 | Japan .......................... 280/801 A |
| 2279445 | 4/1989 | Japan . |
| 2127277 | 4/1984 | United Kingdom . |

Primary Examiner—Eric Culbreth
Attorney, Agent, or Firm—Bruce L. Adams; Van C. Wilks

[57] ABSTRACT

A shoulder adjuster apparatus comprises an adjuster rail assembly attachable to and along an attaching portion of a vehicle body, and a slide garnish which covers a front surface side of the adjuster rail assembly. A slide assembly is slidably supported in a guide route formed within the adjuster rail assembly. A latch unit detachably latches the slide assembly at a predetermined position on the adjuster rail assembly. An operation mechanism releases the latch unit from a latched state. A webbing anchor unit is fixed on the slide assembly for supporting a webbing. The slide assembly is easily fixed with the slide garnish by a one-step snapping operation. In assembling the apparatus, the latch unit is mounted into a latch hole of the slide garnish. The operation mechanism is attached to a face side of the slide garnish, and a slide anchor base body is set to a back surface of the slide garnish. An anchor nut is assembled with the slide anchor base body, and a slide anchor cover body overlaps the slide anchor base body and snaps in place on the back surface of the slide garnish. The slide assembly is inserted into the guide route of the adjuster rail assembly and the slide adjuster assembled body is mounted to the attaching portion of the vehicle body. A webbing anchor unit is secured to the slide assembly by the anchor nut.

12 Claims, 25 Drawing Sheets

SHOULDER ADJUSTER APPARATUS AND ASSEMBLING METHOD OF THE SAME

BACKGROUND OF THE INVENTION

The present invention relates to shoulder adjuster apparatus to be mounted on an automobile, and also relates to an assembling method of the same capable of adjusting the position in a height of webbing anchor in accordance with a sitting height of a rider of the automobile.

Attaching of a seat belt apparatus is obligatory for an automobile to keep and secure the safety of a rider. When a rider is to set a seat belt (webbing) by operating a seat belt apparatus, there is a fear of a so-called "hanging" state depending on the sitting height of the rider. To prevent such hanging state from happening to secure a comfortable drive, various types of shoulder adjuster apparatus have been proposed, which are capable of adjusting the upward position of the webbing anchor in accordance with the sitting height of the rider. One of such types of shoulder adjuster apparatus is a seat belt anchor apparatus, disclosed in Japanese Patent Laid-Open No. 2-279445, proposed by the present inventor as a shoulder adjuster apparatus. In a conventional shoulder adjuster apparatus, an adjuster rail to be fixed on an attaching portion of a vehicle body such as the center pillar is constructed in a linear form, where it is difficult to attach the adjuster rail to the curved body attaching portion in a stable manner. Also, since the number of component parts in such a shoulder adjuster apparatus is large, the assembling process thereof is complicated and time-consuming, thus automatization is difficult. Also, assembling such a shoulder adjuster apparatus cannot be efficiently performed, resulting in an increase in costs.

Further, since, in a conventional shoulder adjuster apparatus, the slide assembly is not constructed to be stably held in a slide garnish, the webbing anchor means cannot be stably attached to this slide garnish. There is thus a problem in the strength of the webbing anchor and, as the number of the component parts in the operating mechanism is large, the assembling of the operation mechanism is complicated, which has been the cause in increasing costs and a large amount of time and labor have been necessary.

Furthermore, while the slide assembly is constructed to accommodate the webbing anchor means, a slide positioning means and a latch coil spring of a latch means, the slide assembly cannot be integrally assembled with the slide garnish. Thus, the webbing anchor means, the slide positioning means and the latch coil spring cannot be stably accommodated, causing an unstableness which is an obstacle in promoting an automatic assembling.

Moreover, in a conventional shoulder adjusting apparatus, in addition to the unfavorable assembling characteristic, while the coil spring of the slide positioning means is to be accommodated, the coil spring is difficult to be accommodated in a stable manner. Further, since the latch means is to be mounted on the slide assembly of which the assembling characteristic is not favorable, it cannot be assembled in a stable manner. Otherwise, since the shape of the latch plate is complicated as it is constructed with teeth, its press working has been difficult.

SUMMARY OF THE INVENTION

The present invention has been made in the light of the above described facts, and a primary object of the present invention is to provide a shoulder adjuster apparatus and assembling method thereof in which the adjuster rail may be attached in a stable manner to the attaching portion of the body and the apparatus can be stably and smoothly assembled in a short period of time by improving the assembling characteristic of the components parts to achieve a cost reduction.

Another object of the present invention is to provide a shoulder adjuster apparatus and assembling method thereof in which components such as a slide assembly, a latch means, an operation mechanism and a webbing anchor means are integrally assembled with a slide garnish side to make possible efficient automatic assembling.

A further object of the present invention is to provide a shoulder adjuster apparatus and assembling method thereof in which the slide assembly may be stably mounted on a slide garnish to improve assembling characteristic of the webbing anchor and to increase the strength thereof.

A still further object of the present invention is to provide a shoulder adjuster apparatus and assembling method thereof in which the number of component parts of the operation mechanism is reduced to improve its assembling characteristic to the slide garnish and its operating characteristic and at the same time to achieve a reduction in costs.

A yet still further object of the present invention is to provide a shoulder adjuster apparatus and assembling method thereof, in which the latch means is attached to the slide garnish side to improve its assembling characteristic and the plate shape of the latch plate is simplified to facilitate its processing and assembling.

Further, another object of the present invention is to provide a shoulder adjuster apparatus and assembling method thereof, in which slide positioning means is stably accommodated in its positioning state in the slide assembly which is stably assembled with the slide garnish.

Furthermore, another object of the present invention is to provide a shoulder adjuster apparatus and assembling method thereof, in which operation buttons of the operating mechanism and a latch cap of the latch means are caused to engage each other stably and smoothly by forming the same with a resin material.

These and other objects can be achieved according to the present invention by providing, in one aspect, a shoulder adjuster apparatus to be attached to an attaching portion of a body of a vehicle, which comprises:
an adjuster rail means to be attached to and along the attaching portion of the vehicle body;
a slide garnish for covering a front surface side of the adjuster rail means;
a slide assembly accommodated slidably in a guide route formed within the adjuster rail means;
a latch means for causing the slide assembly to be detachably latched at a predetermined position of the adjuster rail means;
an operation mechanism for releasing the latch mean from a latched state; and
a webbing anchor means fixed on the slide assembly for supporting a webbing,
wherein the slide assembly, the latch means, the operation mechanism and the webbing anchor means are assembled on a side of the slide garnish to form an integrated slide adjuster assembled body.

In preferred embodiments, the adjuster rail means includes a rail and a slider support means for elastically supporting the slide assembly upwardly in an installed state, the slider support means and the rail being fastened together to the attaching portion of the vehicle body. The rail has a rear surface side having a curved shape corresponding to the shape of the attaching portion of the vehicle body. The slider support means includes a support plate to be engaged with the rail of the adjuster rail means and a support spring detachably supported to the support plate.

The slide assembly has a cylindrical structure formed of a flat metal and is composed of a slide anchor base body provided on a back surface side of the slide garnish and a slide anchor cover body which overlaps the slide anchor base body and the slide assembly is integrally assembled with the slide garnish by latching the slide anchor cover body by means of an engaging claw and a latching window formed on the back surface side of the slide garnish.

In another aspect of the present invention, there is provided a method of assembling a shoulder adjuster apparatus which is attached to an attaching portion of a vehicle body and which comprises, as described in the former aspect, an adjuster rail means provided with a guide route, a slide garnish provided with a latch hole, a latch means, an operation mechanism provided with operation buttons, a slide assembly provided with a slide anchor base body and a slide anchor cover body, and a webbing anchor means provided with a flanged anchor nut, the assembling method comprising the steps of:

mounting the latch means into the latch hole of the slide garnish;

attaching the operation mechanism to a face side of the slide garnish;

setting the slide anchor base body to a back surface of the slide garnish;

assembling the anchor nut with the slide anchor base body;

overlapping the slide anchor cover body in a state assembled with the anchor nut to engage the slide anchor cover body at an assembly mounting portion on the back surface side of the slide garnish;

inserting the slide assembly into the guide route of the adjuster rail means from one side thereof to assemble the slide assembly with the adjuster rail means as a slide adjuster assembled body; and mounting the slide adjuster assembled body to the attaching portion of the vehicle body.

Preferably, the latch means is mounted on the slide garnish by inserting a latch plate having a latch spring mounted thereon into the latch guide hole of the slide garnish from the back surface side thereof and by holding an inserted end of the latch plate from the face surface side of the slide garnish by means of a latch cap. The anchor nut is assembled onto the slide assembly in a state where the slide anchor base body is set on the back surface side of the slide garnish and a spring plate of a slide positioning means is set and positioned and the slide anchor cover body is then caused to overlap the slide anchor base body to attach the slide assembly to the back surface side of the slide garnish. A support spring of a slider support means is mounted on a spring receiving opening of the slide assembly before assembling the slide adjuster assembled body with the adjuster rail means and when the slide adjuster assembled body is assembled with the adjuster rail means, the assembly support means is caused to engage an engaging notch of the adjuster rail means and is fixed to the adjuster rail means. The adjuster rail means has a back side surface to be attached to the attaching portion of the vehicle body, the back side surface having a curved shape corresponding to a shape of the attached portion of the vehicle body.

Assembling of the shoulder adjuster apparatus is simple and easy, since the slide adjuster assembly are put together with the adjuster rail after integrally assembling the slide adjuster assembly. The slide assembly to be incorporated into the shoulder adjuster apparatus may be also attached to the slide garnish in the state where the slide anchor base body and the cover body overlap each other. Further, a flange portion of the anchor nut is sandwiched between the slide anchor base and the cover body thereof. The webbing anchor means may thus be stably fixed and it is possible to improve its assembling characteristic and to improve the attached strength of the webbing anchor means.

The nature and further characteristic features of the present invention will be made more clear by way of the preferred embodiment with reference to the accompanying drawings.

DESCRIPTION OF THE PREFERRED EMBODIMENTS

Figure 1:
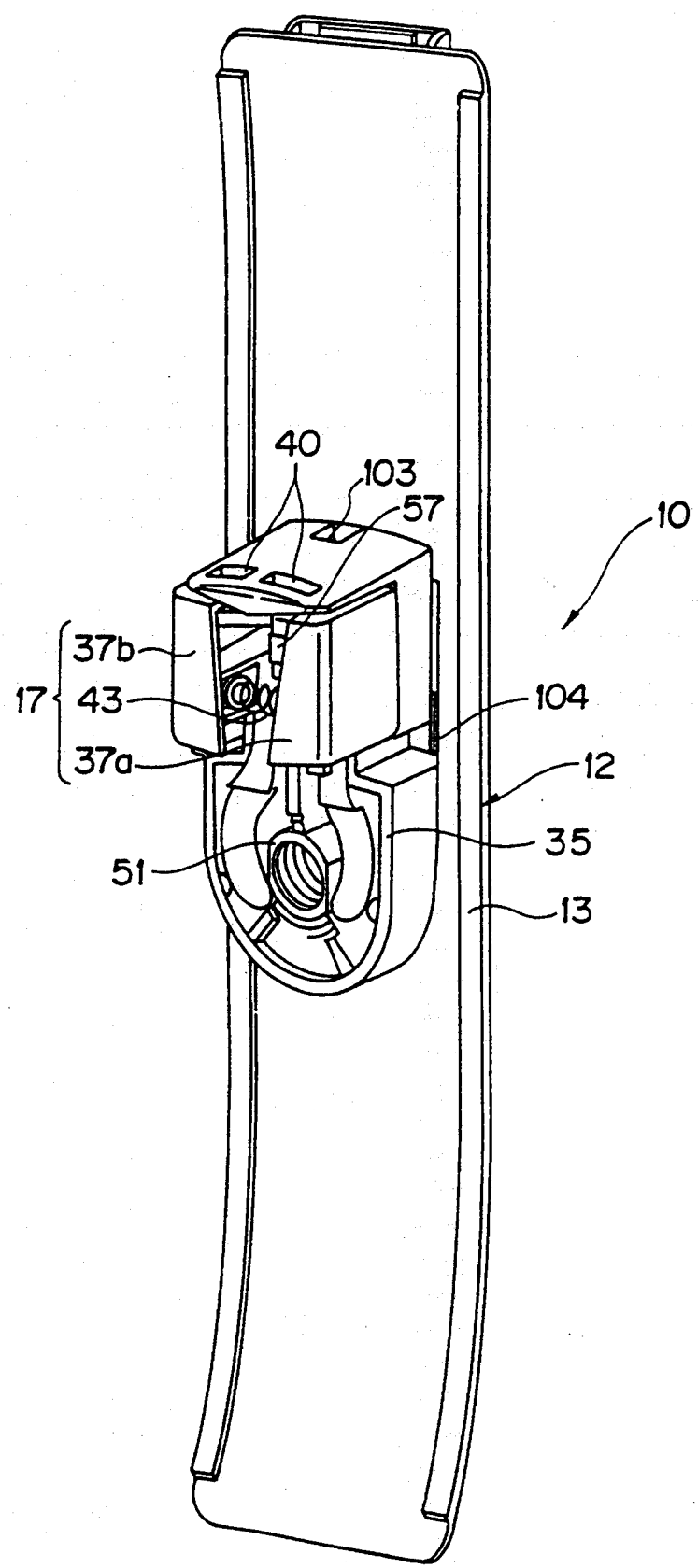
FIG. 1 is a perspective view showing an embodiment of a shoulder adjuster apparatus to be attached to a vehicle body according to the present invention in the state where the adjuster cover thereof is removed.
Figure 2:
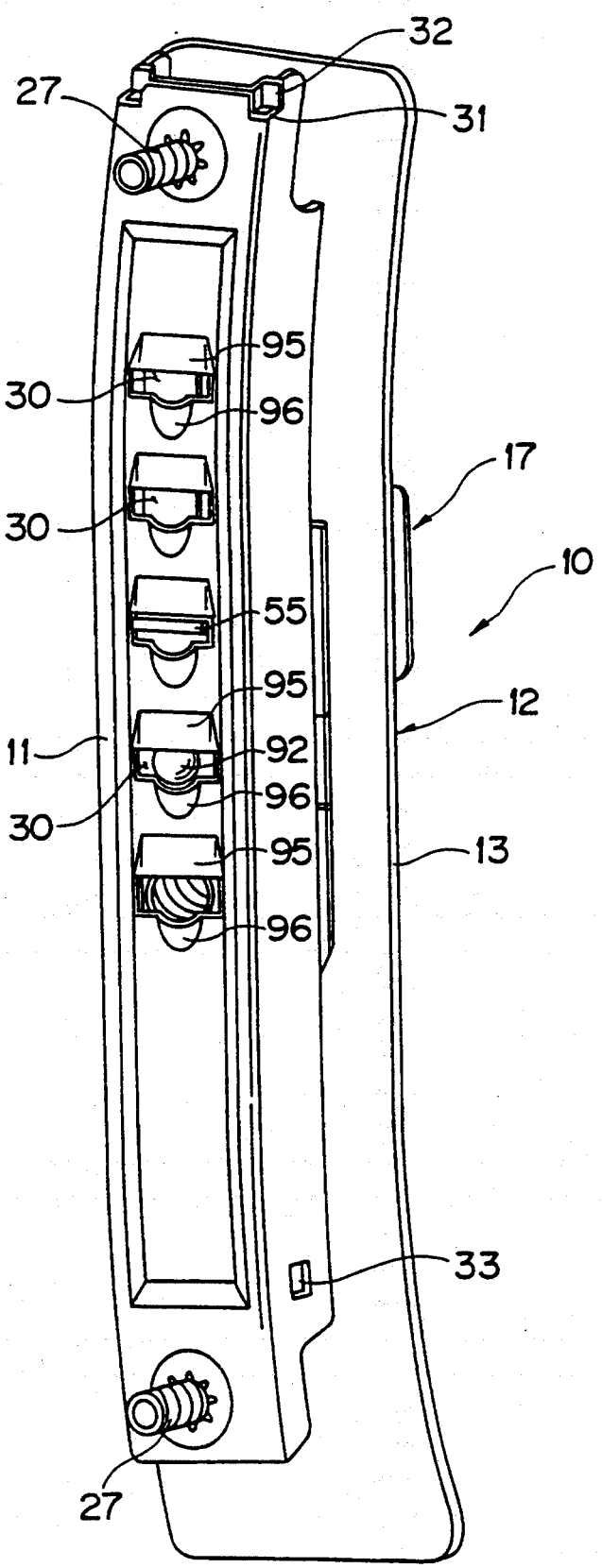
FIG. 2 is a perspective view showing from its reverse side the embodiment of a shoulder adjuster apparatus shown in FIG. 1.

An embodiment of the present invention will now be described with reference to the accompanying drawings.

FIGS. 1 to 6 show an example of a shoulder adjuster apparatus according to the present invention. In the figures, numeral 10 denotes a shoulder adjuster apparatus to be attached to an attaching portion such as the center pillar of the body of a passenger car. The shoulder adjuster apparatus 10 has an adjuster rail 11 which is a pillar rail formed into a curved shape along the attaching portion of the body and a slide adjuster assembled body 12 which serves as a slider to be assembled with the adjuster rail 11.

The slide adjuster assembled body 12 has a slide garnish 13 serving as a cosmetic plate covering the rail surface side of the adjuster rail 11. Mounted and integrated on the side of the slide garnish 13 are: a slide assembly 15 which slides along the guiding route 14; a latch means 16 for latching the slide assembly 15 at a required position; an operation mechanism 17 for releasing the latch means 16 by operation; and webbing anchor means 18 for supporting the webbing serving as a seat belt, not shown. The operating mechanism 17 is covered by an adjuster cover 19.

Further, the slide assembly 15 is assembled with a slide positioning means 20 for positioning the slide adjuster assembled body 12 and, on the other hand, a slider support means 21 for supporting the slide adjuster assembled body 12 is mounted on the slide assembly 15. The slider support means 21 engages and is held by the adjuster rail 11 when the slide adjuster assembled body 12 is assembled with the adjuster rail 11 to support the slide adjuster assembled body 12, making the upward sliding of the assembled body 12 to be effected smoothly.

On the other hand, the adjuster rail 11 of the shoulder adjuster rail 11 of the shoulder adjuster apparatus 10 is constructed as shown in FIGS. 7 to 11 by such steel materials as S55C, a carbon steel, and is formed as a whole into a curved shape along the attaching portion of the body. The adjuster rail 11 is formed, as its section being shown in FIG. 9 and FIG. 10, by a rail bottom portion 23 forming the rail base, a pair of rail side portions 24 raised from the rail bottom portion and inside flange guides 25 inwardly bent from the peak portions of the both rail side portions. The slider portion of the slide adjuster assembled body 12 is accommodated in the internally located guide route 14. Attaching holes 26a, 26b are formed on both the end portions of the rail bottom portion 23 of the adjuster rail 11. The adjuster rail 11 is fixed onto a body attaching portion such as a center pillar as briefly denoted by reference numeral 200 in FIG. 3 by means of these attaching holes 26a, 26b using fastening means such as fastening screws 27. At this time, since the adjuster rail 11 is formed into a curved shape along the attaching portion of the body, it is stably attached thereto. One attaching hole 26b of the adjuster rail 11 is formed to have a slender opening to make possible smooth attaching of the adjuster rail 11 to the attaching portion of the body.

The rail bottom portion 23 of the adjuster rail 11 is reinforced as it is formed into a concave having a slender rectangular shape, and a plurality of lock holes are formed in the concave portion in the transverse direction of the rail. The lock holes 30 are arranged at the same pitch in the longitudinal direction of the adjuster rail 11.

A pair of engaging grooves having openings at the upper portion thereof are formed on a rail side portion 24 of the upper end side of the adjuster rail 11, and ear-like portion 32 of the slider support means is adapted to engage the engaging grooves 31. Further, a pair of holding projections 33 are provided in a manner forming respectively concaves on the rail side portion 24 of the adjuster rail 11 and projecting inward. The slide assembly 15 of the slide adjuster assembled body 12 are caused to be engaged and latched by the holding protrusions 33, thereby regulating sliding, downward sliding, of the slide adjuster assembled body 12. Sliding of the slide adjuster assembled body 12 in other directions is regulated by fastening screw 27.

Figure 11:
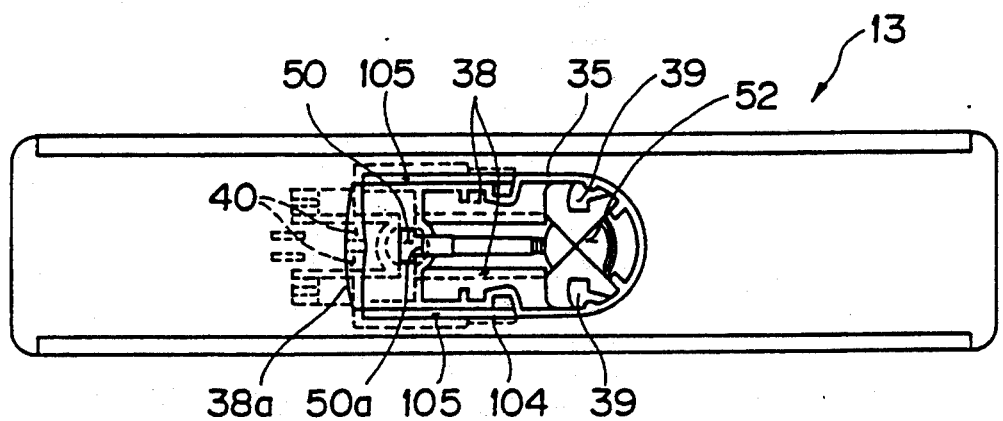
FIG. 11 is a front view of a slide garnish constituting a part of a shoulder adjuster apparatus of the present invention.
Figure 12:
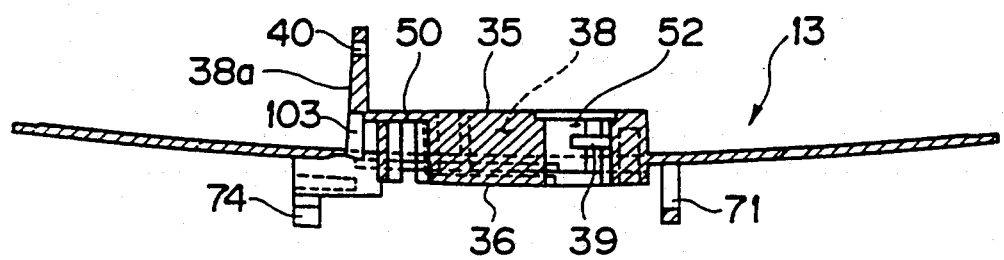
FIG. 12 is a longitudinal section of the slide garnish as shown in FIG. 11.
Figure 13:
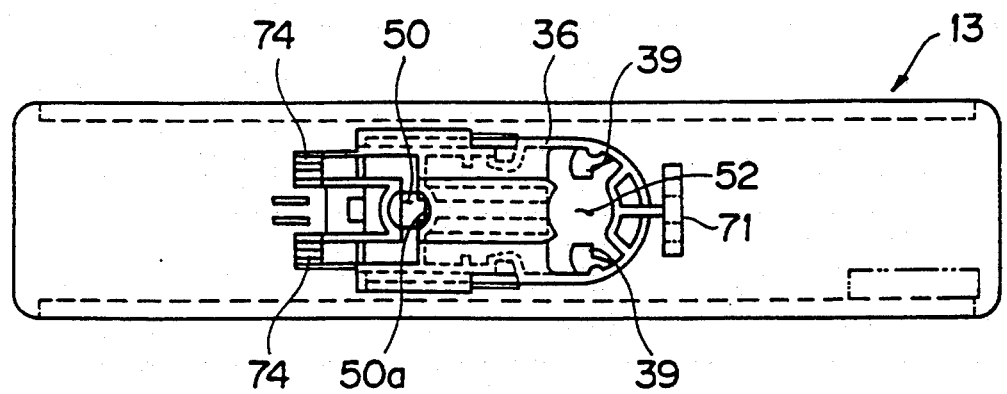
FIG. 13 is a back side view of the slide garnish as shown in FIG. 11.

Further, the slide garnish 13 is formed as shown in FIGS. 11 to 13 by integrally forming resins such as polypropylene, where a button mounting portion 35 of the operation mechanism 17 and a mounting portion 36 for the slide assembly 15 are formed on the face side and the reverse side thereof, respectively, in an opposing manner. The slide garnish 13 is curved correspondingly to the curved shape of the adjuster rail 11.

On the button mounting portion 35 of the operation mechanism 17 to be formed on the face side of the slide garnish 13, a button accommodating portion 38 for accommodating a pair of operation buttons 37a, 37b of the operation mechanism is formed. On the button accommodating portion 38, a pair of guide projections 39 for latching and holding the operation buttons 37a, 37b of the operation mechanism are provided and stroke guide holes 40 for guiding the operation stroke of the operation buttons 37a, 37b are respectively formed. The stroke guide holes 40 are formed on a projecting portion 38a to be formed on the head side of the button accommodating portion 38.

Figure 3:
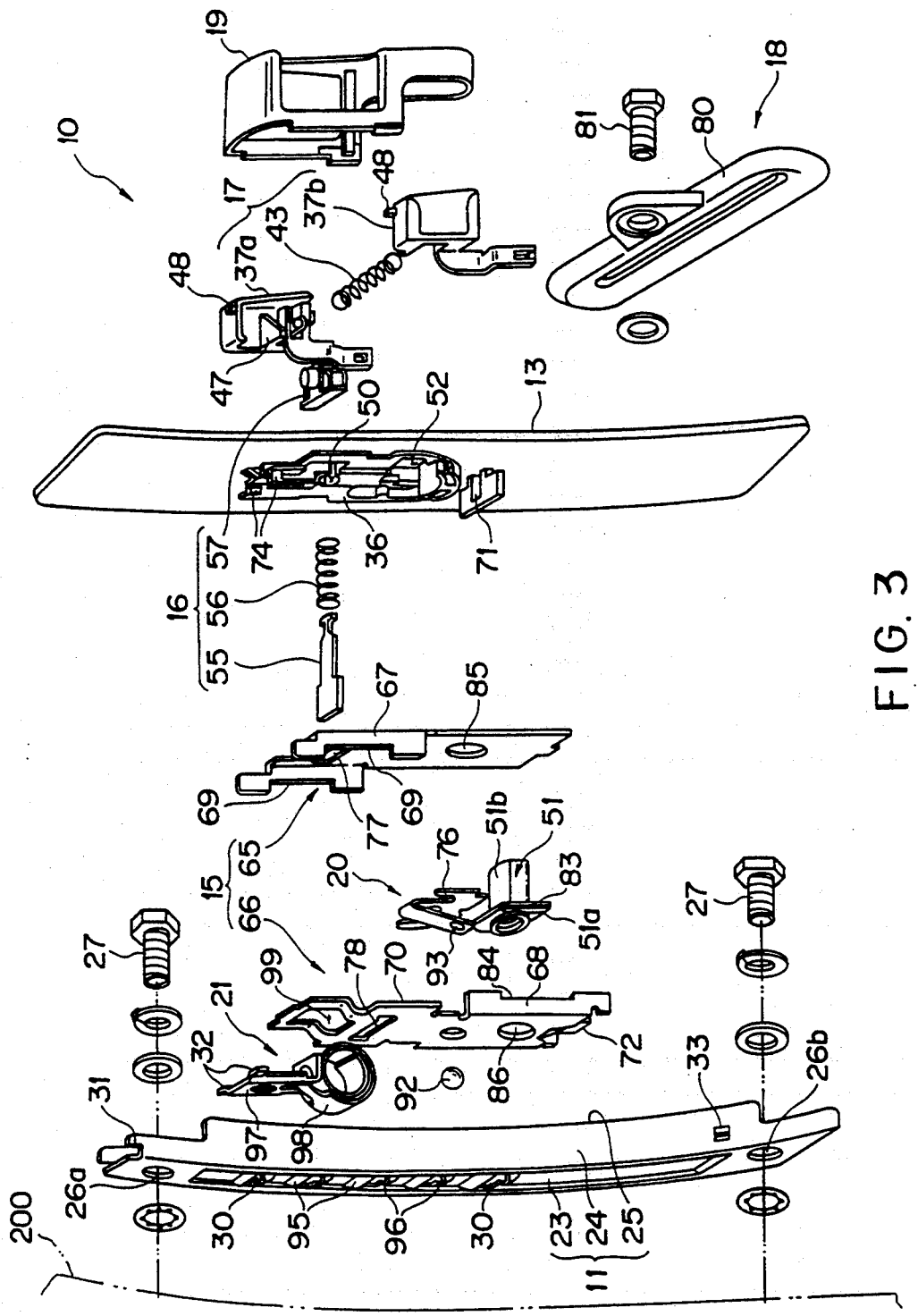
FIG. 3 is an exploded perspective view of the embodiment of a shoulder adjuster apparatus shown in FIG. 1.
Figure 4:
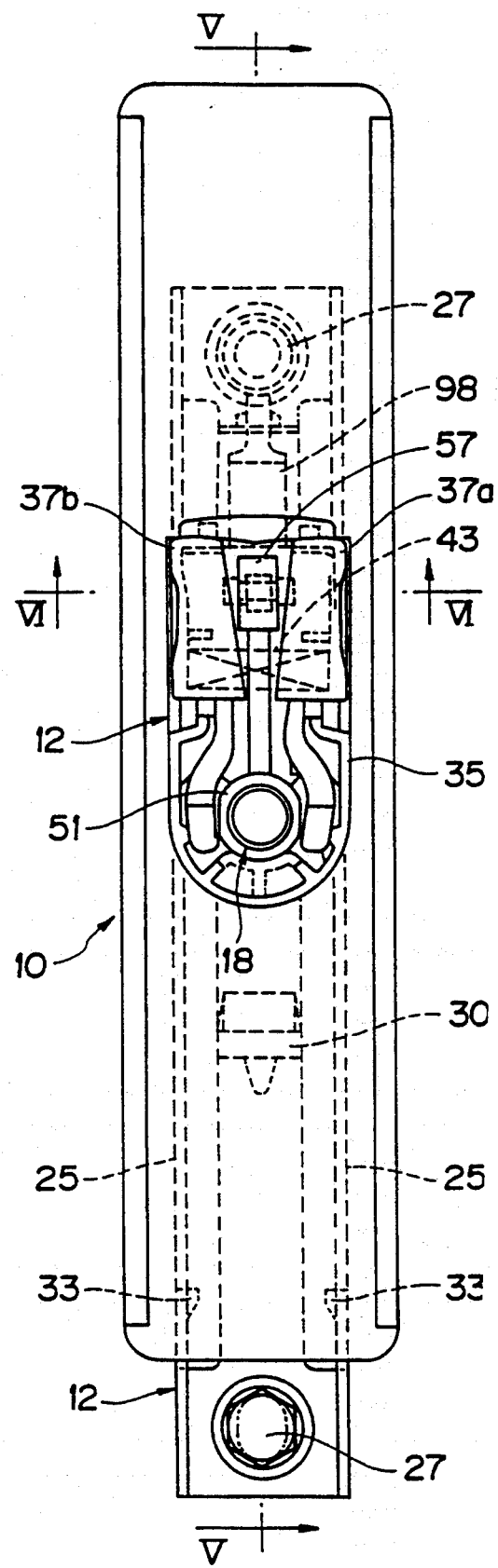
FIG. 4 is a front view of the embodiment of a shoulder adjuster apparatus shown in FIG. 1 according to the present invention.
Figure 5:
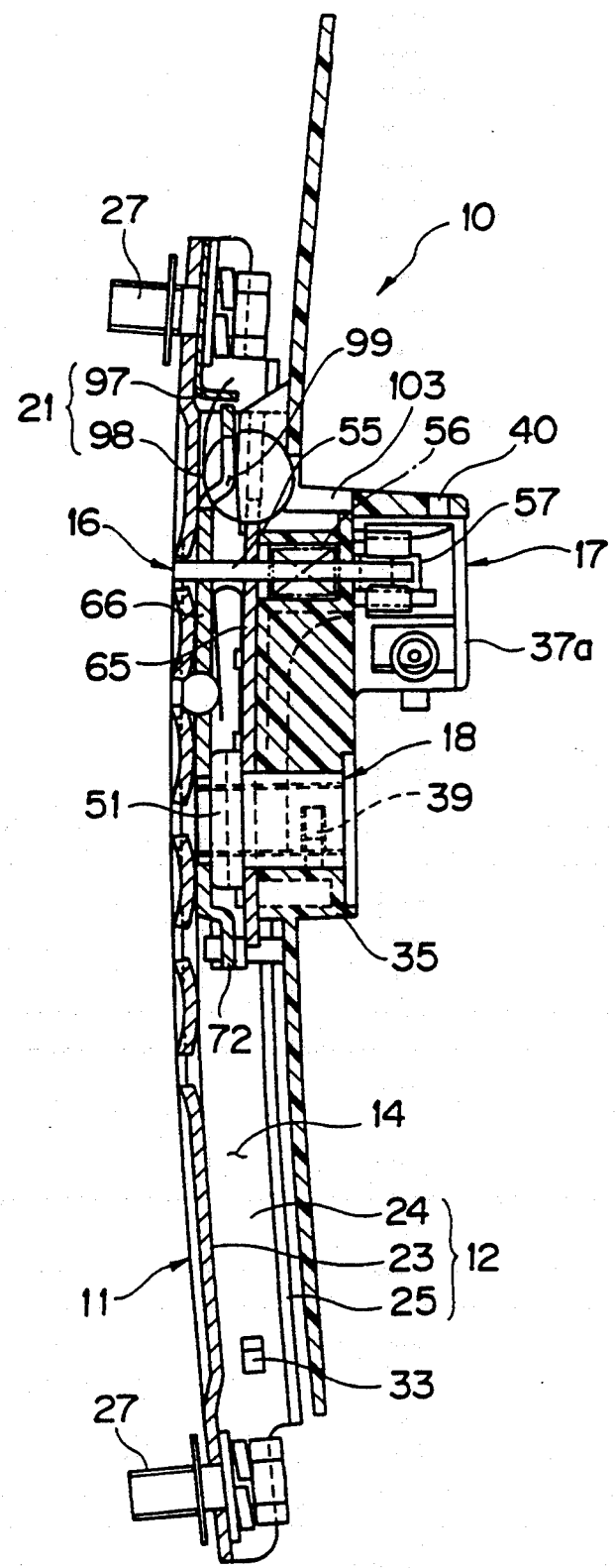
FIG. 5 is a longitudinal section taken along line V—V of the shoulder adjuster apparatus as shown in FIG. 4.
Figure 6:
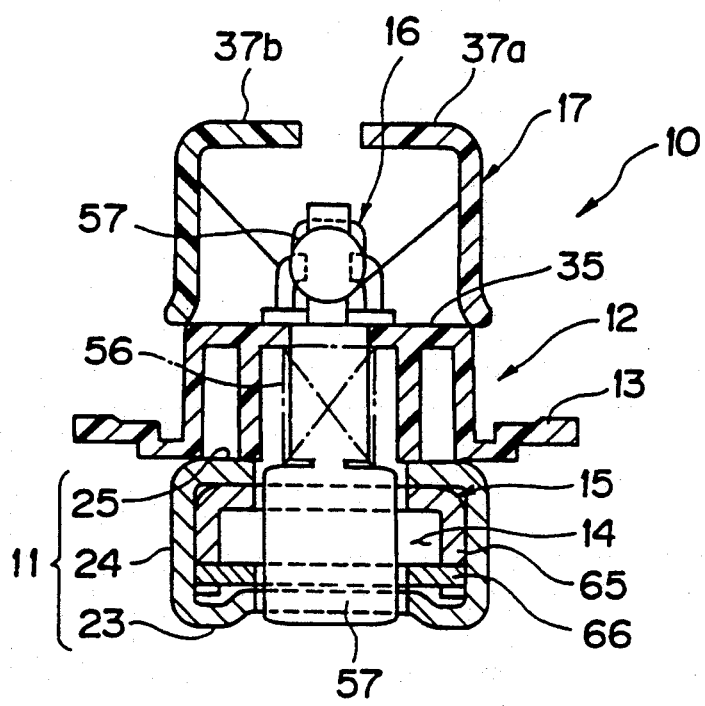
FIG. 6 is a cross section taken along line VI—VI of the shoulder adjuster apparatus as shown in FIG. 4.
Figure 7:
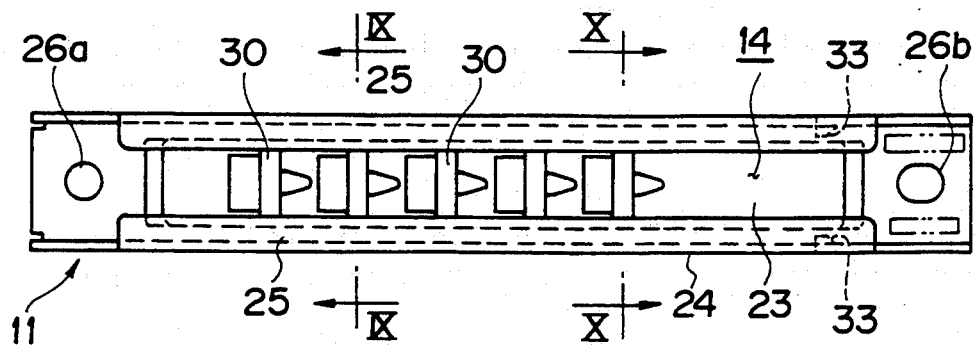
FIG. 7 is a front view of an adjuster rail constituting a part of a shoulder adjuster apparatus according to the present invention.
Figure 8:
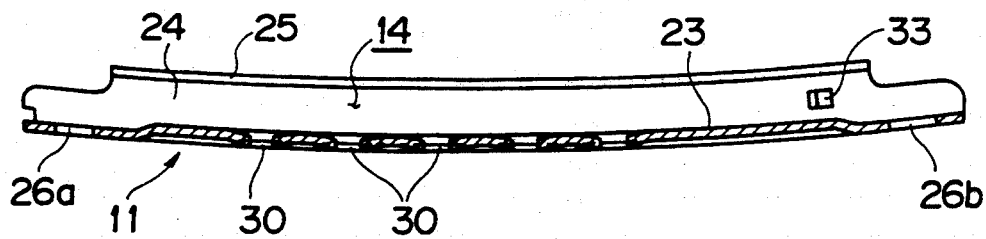
FIG. 8 is a longitudinal section of the adjuster rail as shown in FIG. 7.
Figure 9:
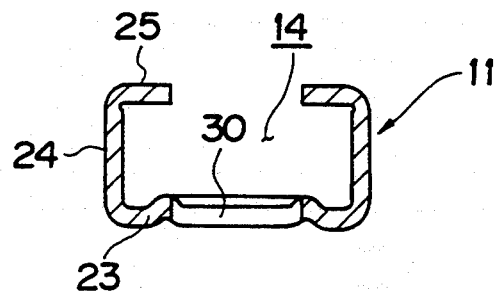
FIG. 9 is a cross section taken along line IX—IX of the adjuster rail as shown in FIG. 7.
Figure 10:
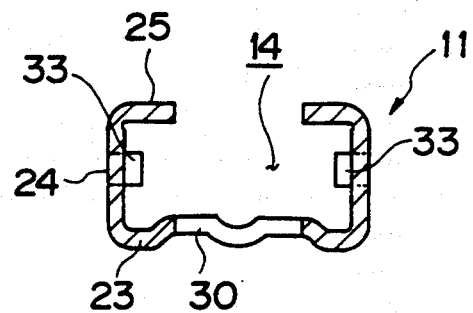
FIG. 10 is a cross section taken along line X—X of the adjuster rail as shown in FIG. 7.
Figure 14:
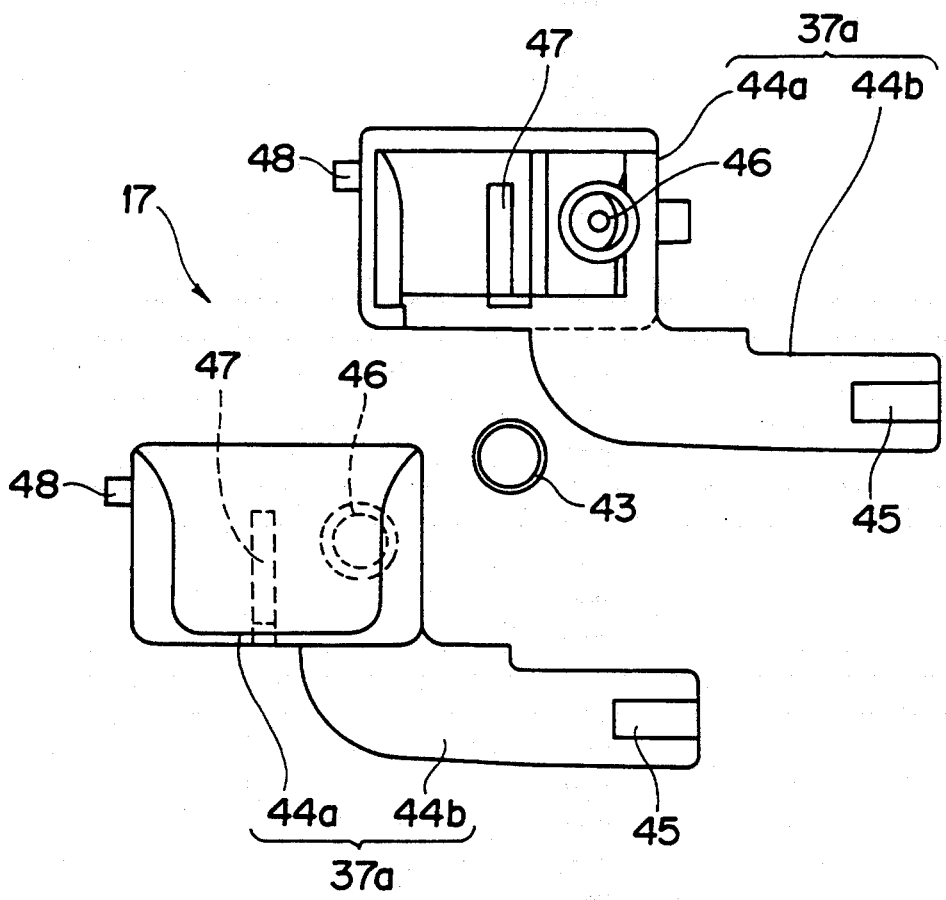
FIG. 14 is an exploded view showing an operation mechanism to be incorporated in a shoulder adjuster apparatus of the present invention.
Figure 15:
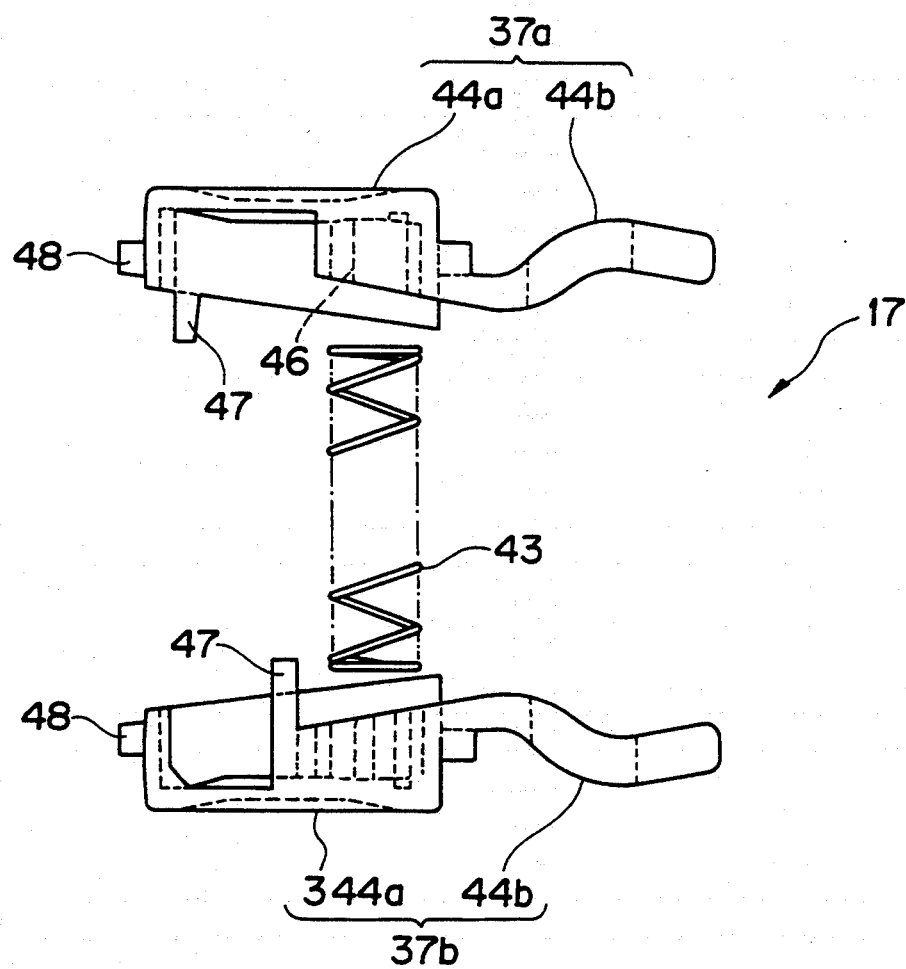
FIG. 15 is a view showing the operation mechanism as shown in FIG. 14 from the bottom side thereof.

On the other hand, the operation mechanism 17 to be mounted on the button accommodating portion 38 of the slide garnish 13 has, as shown in FIG. 3, and FIGS. 14 and 15, pair of operation buttons 37a, 37b and a return spring 43 for urging the operation buttons 37a, 37b to their original position by means of spring. The pair of operation buttons 37a, 37b are formed symmetrically and each of the operation buttons 37a, 37b has integrally formed operating button portion 44a and guide leg portion 44b. An engaging hole 45 is formed on the distal end of the guide leg portion 44b and the guide projection 39 formed on the button accommodating portion 38 of the slide garnish 13 is hooked on and held at the engaging hole 45.

Further, on the respective insides of the operating button portions 44a of the pair of operation buttons 37a, 37b, spring seats 46 for receiving the return spring 43 are caused to protrude in an opposing manner and taper guide portions 47 are also formed, respectively. The taper guide portion 47 is adapted to engage the latch means 16. Further, guide projections 48 for engaging the stroke guide holes 40 of the button mounting portion 35 are provided on the head side of the pair of operation buttons 37a, 37b, and the operation stroke of the operation buttons 37a, 37b are determined as the guide projections 48 engage stroke guide holes 40 of the button mounting portions 35. In this configuration, as shown in FIGS. 11 to 13, button mounting portion 35 of the slide garnish has a latch mounting hole 50 formed on one side thereof for mounting the latch means 16 and an anchor guide hole 52 formed on the other side thereof for guiding an anchor nut 51 having a flange of the webbing anchor means 18.

Figure 16:
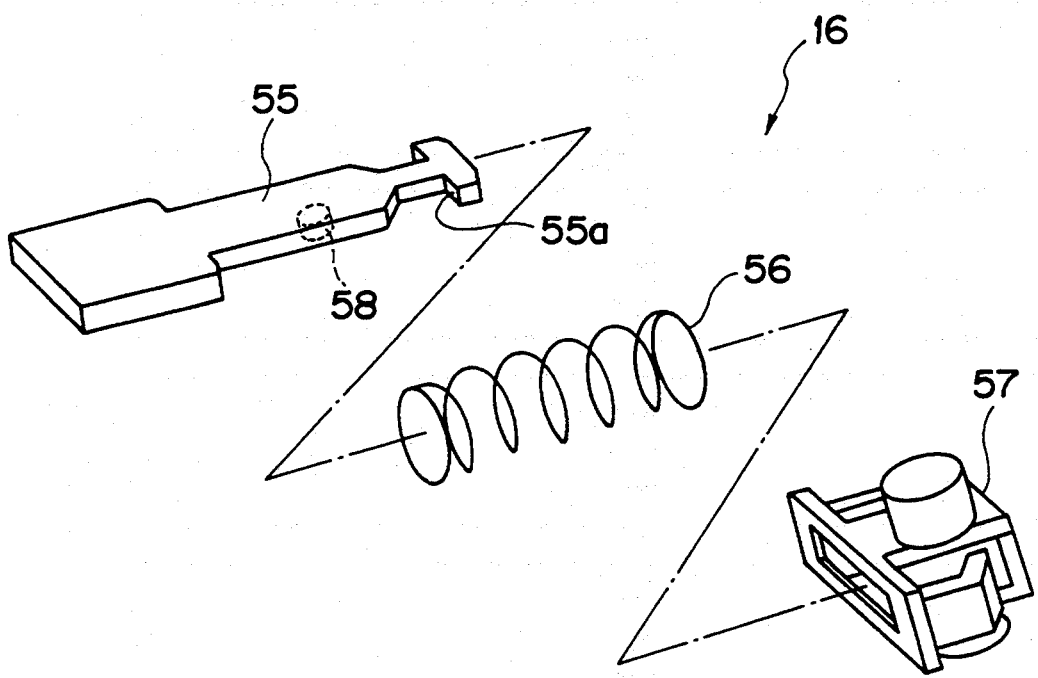
FIG. 16 is an exploded perspective view showing latch means to be incorporated into a shoulder adjuster apparatus of the present invention.

As shown in FIG. 16, the latch means 16 to be mounted in the latch mounting hole 50 of the slide garnish 13 has a simple-shaped latch plate 55 formed by machining such as of press molding, a latch spring 56 wound over the latch plate 55, and a latch cap 57 made of such resin as polyacetal which is mounted on and engaged at the head portion of the latch plate 55.

The latch plate 55 is inserted into the latch mounting hole 50 from the reverse side of the slide garnish 13 while having the latch spring 45 wound thereon. The inserted latch plate 55 is positioned as a guide projection, i.e. dowel, 58 thereof is guided by the guide concave portion 50 of the latch mounting hole 50. The latch means 16 is directly assembled with the slide garnish 13 by putting and fixing the latch cap 57 on the distal end of the latch plate 55 from the reverse surface side of the slide garnish.

Figure 17A:
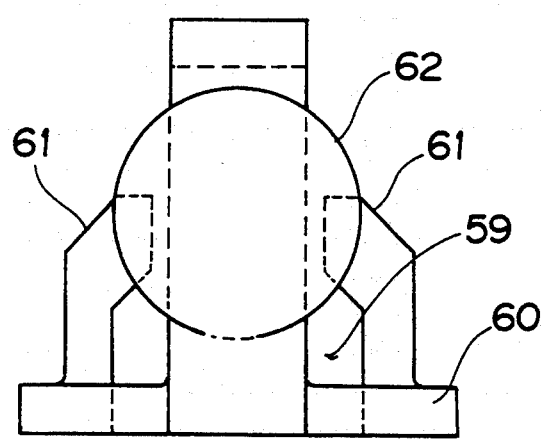
FIG. 17A is a front view of latch cap provided on the latch means.
Figure 17B:
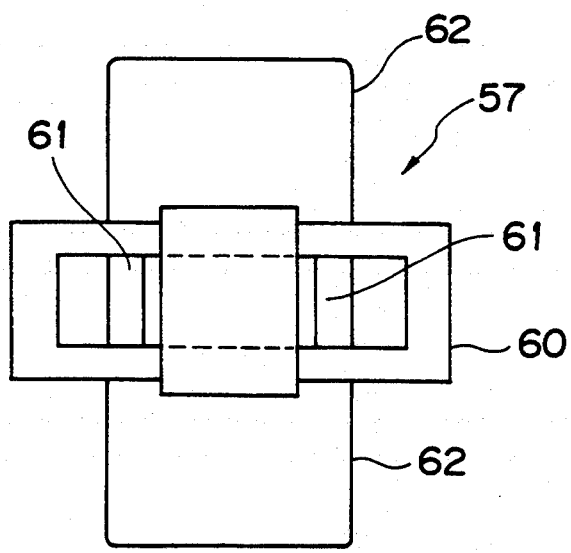
FIG. 17B is a top view of the above described latch cap.

As shown in FIGS. 17A and 17B, the latch plate 57 is made by integrally forming: a cap body 60 having an inserting guide route 59 formed thereon for receiving the terminal end portion of the latch plate 55; a pair of lock claws for engaging the jaws 55a of the latch plate 55 inserted into the cap body 60 to regulate the pulling out of the latch plate 55; and a pair of cylindrical knuckle pins 62 protruding from the both sides of the cap body 60. The taper guide portions 47 of the operation buttons 37a, 37b engage the knuckle pins 62 of the latch cap 57, respectively. The taper guide portions 47 of the operation buttons 37a, 37b push up the latch plate 55 against the spring force of the latch spring 56 by the pressing, i.e. stroke, operation of the operation buttons 37a, 37b, so that it is retracted from the lock holes 30 of the adjuster rail 11 to release the latched state thereof.

Figure 18A:
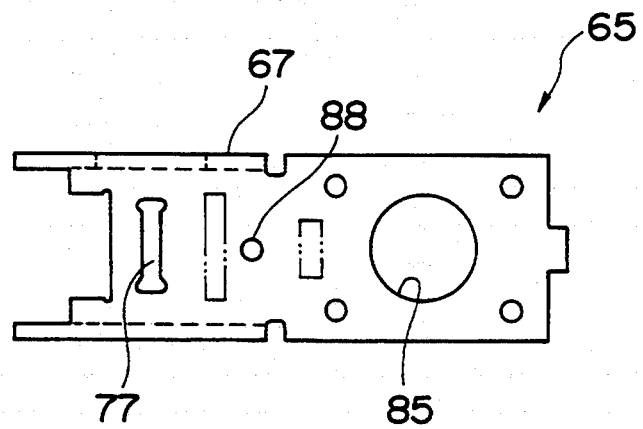
FIGS. 18A and 18B are a front view and a side view, respectively, showing a slide anchor base body of a slide assembly to be incorporated into the shoulder adjuster apparatus.
Figure 18B:
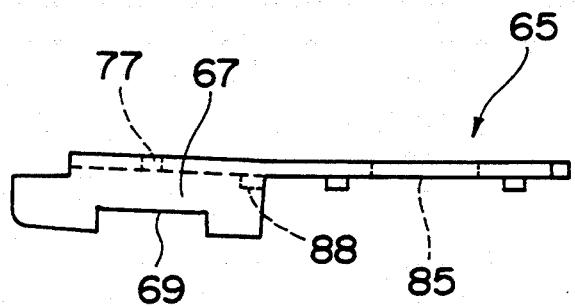
Figure 19A:
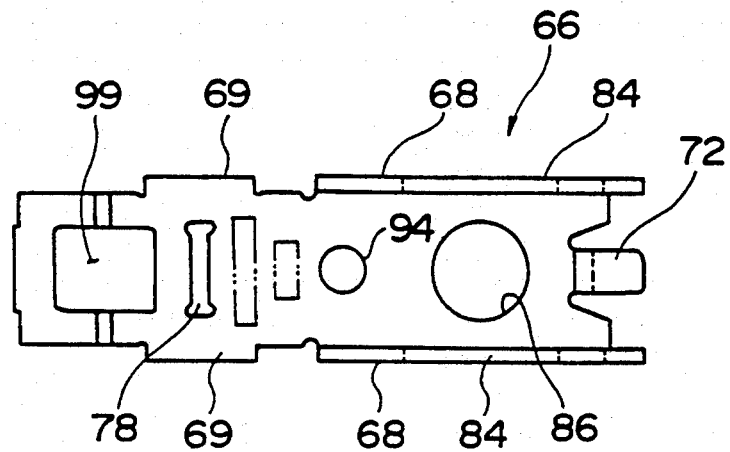
FIGS. 19A and 19B are a top view and a side view, respectively, showing a slide anchor cover body of the slide assembly.
Figure 19B:
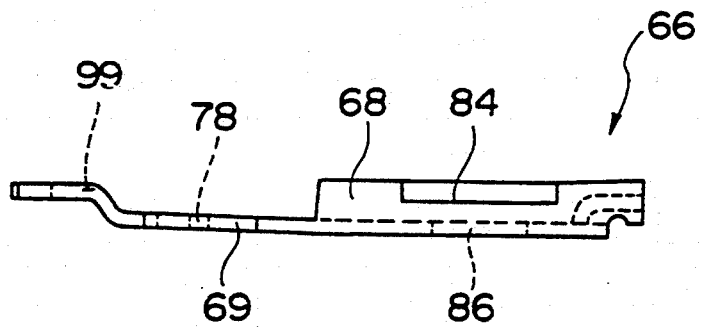

Further, the slide assembly 15 to be mounted on the reverse surface side of the slide garnish 13 has fixing means including a slide anchor base body 65, as shown in FIGS. 18A and 18B, to be mounted on an assembly mounting portion 36 of the reverse surface side of the slide garnish 13 and a slide anchor cover body 66, as shown in FIGS. 19A and 19B, overlapping the base body 65. When the slide anchor cover body 66 is caused to overlap the base body 65, the respective pairs of raised sides 67, 68 engages each other to form a flat cylindrical structure.

The slide assembly 15 is formed for example by processing a steel plate such as of a carbon steel by means of press forming. Sliding in the relative longitudinal direction may be regulated by causing a side projection 70 of the slide anchor cover body 66 to engage the engaging concave portion 69 formed on the raised sides 67 of the slide anchor base body 65. A holding protrusion 72, capable of engaging a snap fit assembly including a holding window 71 of the slide garnish 13, is provided on one of the ends of the slide anchor cover body 66 of the slide assembly 15, and the other end side portion of the slide anchor cover body 66 engages a pair of holding claws 74, 74 of the snap fit assembly formed on the slide garnish 13 by merely touching. The slide assembly 15 is assembled with the slide garnish 13 by means of the holding claws 74, 74.

Further, as shown in FIG. 3, an anchor nut 51 having a flange of the webbing anchor means 18 and a spring plate 76 of the slide positioning means 20 are positioned and mounted on the slide anchor base body 65 of the slide assembly 15, and latch guides 77, 78 for guiding the latch plate 55 of the latch means 16 are formed on the slide anchor base body 65 and the cover body 66 thereof.

Figure 20:
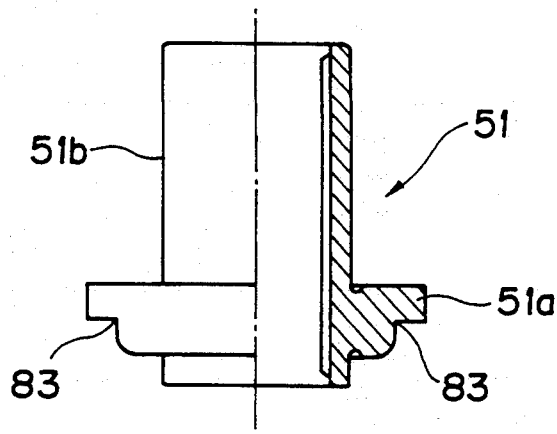
FIG. 20 is a view showing an anchor nut of webbing anchor means to be incorporated into the shoulder adjuster apparatus.

As shown in FIGS. 3 and 20, the webbing anchor means 18 has an anchor nut 51 having an integrally formed straight-sided flange 51a thereon, a webbing anchor 80 for guiding webbing which serves as the seat belt, and an anchor bolt 81 which serves as the fastening means for attaching the webbing anchor 80 to the anchor nut 51.

The flange portion 51a of the anchor nut 51 is stably sandwiched between the slide anchor base body 65 and the cover body 66 thereof. The flange portion 51a of the anchor nut 51 has an engaging stepped portion 83 formed on the flange end thereof. The engaging stepped portion 83 engages an engaging concave portion 84 of a pair of side projections 68 of the slide anchor cover body 66 to stop the whirling of the anchor nut 51. Further, the cylindrical nut portion 51b of the anchor nut 51 protrudes through the nut guide hole 85 of the slide anchor base body 65. The cylindrical nut portion 51b also protrudes toward the slide anchor cover body 66 from the polygonal flange portion 51a. The protruding portion thereof engages the nut guide hole 86 of the slide anchor cover body 66 to stably hold the anchor nut 51.

For the mounting of the anchor nut 51 of the webbing anchor means 18 to the slide assembly 15, the cylindrical nut portion 51b of the anchor nut 51 is inserted into a nut guide hole 85 of the slide anchor base body 65 to bring the flange portion 51a in a close proximity thereto and the slide anchor cover body 66 is caused to overlap the base body 65 thereof. Then, the nut guide hole 86 of the slide anchor cover body 66 is caused to engage the cylindrical nut portion 51b of the anchor nut 51, whereby the anchor nut 51 is positioned on the slide assembly 51 and is stably accommodated therein.

Figure 21:
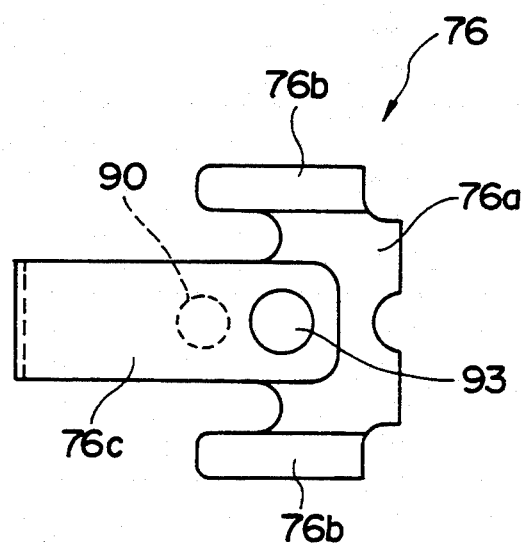
FIG. 21 is a view showing a spring plate of slide positioning means to be incorporated into the shoulder adjuster apparatus.
Figure 22:
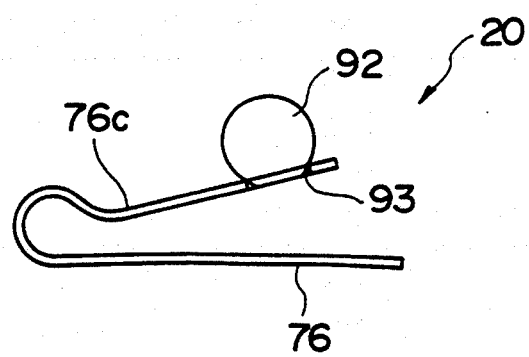
FIG. 22 is a side view of a slide positioning means.

Further, a positioning projection 88 for setting a spring plate 76, as shown in FIGS. 21 and 22, of the slide positioning means 20 in its positioned state is integrally formed on the slide anchor base body 65 of the slide assembly 15. A positioning hole formed 90 on a plate portion 76a of the spring plate 76 engage with the positioning projection 88, and positioning guides 76b are integrally formed on the both sides of the plate portion 76a. A spring portion 76c is formed in a manner bent into U-shape extended from the plate portion 76a of the spring plate 76, and an engaging hole 93 for engaging a positioning ball 92 is formed on the free end side of the spring portion 76c.

The positioning ball 92 is designed to protrude at the side of the rail base portion 23 of the adjuster rail 11 through a ball guide hole 94 formed on the slide anchor cover body 66 to engage the lock hole 30 formed on the rail base portion 23. A tapering plate guide 95 for guiding the latch plate 55 of the latch means 16 and a tapering ball guide 96 for guiding the positioning ball 92, respectively, adjoin a lock hole 30 formed on the rail base portion 23.

Figure 23:
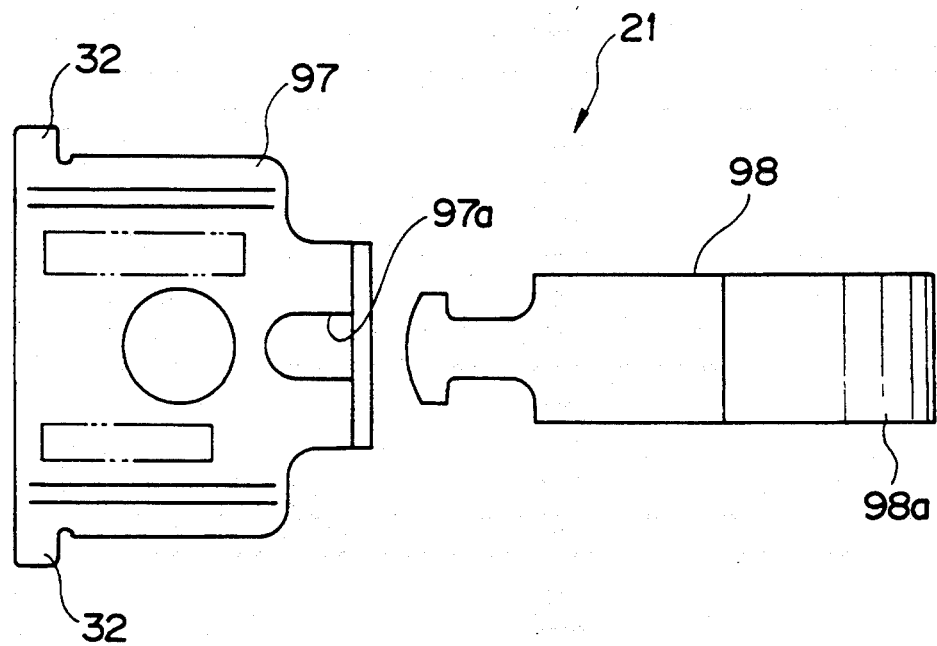
FIG. 23 is an exploded view showing slider support means to be incorporated into the shoulder adjuster apparatus.

Further, a slider support means 21 is mounted on the slide assembly apparatus. As shown in FIG. 23, the slider support means 21 is constituted by two component parts consisting of a support plate 97 and a support spring 98 held in a detachable manner in an engaging hole 97a of the support plate 97.

The support plate 97 has ear-like portions 32 on the both sides thereof, where the ear-like portion 32 engages the engaging groove 31 of the adjuster rail 11 to be supported when the slider support means 21 is assembled with the adjuster rail 11. Further, the support spring 98 has a spiral spring portion 98a, the spring portion 98a being detachably set in a spring receiving opening of the slide anchor cover body 66 of the slide assembly 15.

By constructing the slider support means 21 from the two component parts consisting of the support plate 97 and the support spring 98, it is not necessary to directly attach the support spring 98 to the adjuster rail 11, whereby the assembling characteristic of the slider support means 21 is improved to achieve a reduction in costs.

Figure 24:
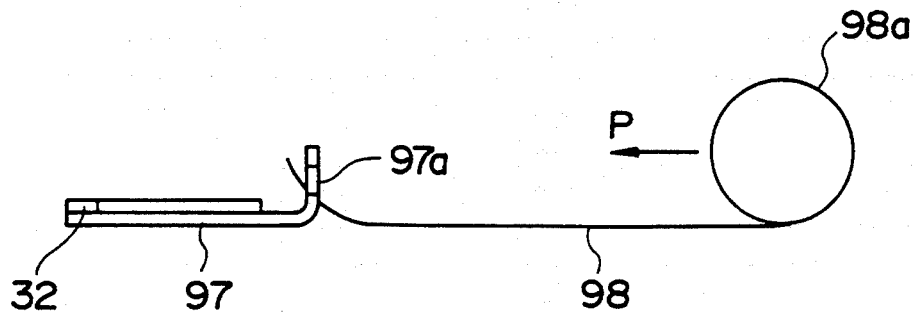
FIG. 24 is a view showing the slider support means in its operating state.

As shown in FIG. 24, the slider support means 21 acts to raise the slide adjuster assembled body 12 serving as the slider assembled with the adjuster rail 11 by a spring force P of the support spring. It thus improves the operating characteristic of the slide adjuster assembled body 12.

Figure 25:
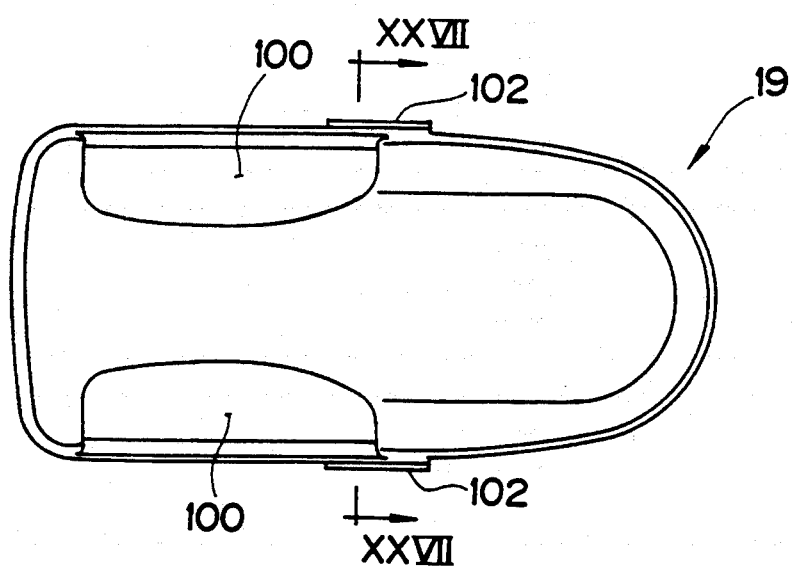
FIG. 25 is a view showing an adjuster cover of the shoulder adjuster apparatus.
Figure 26:
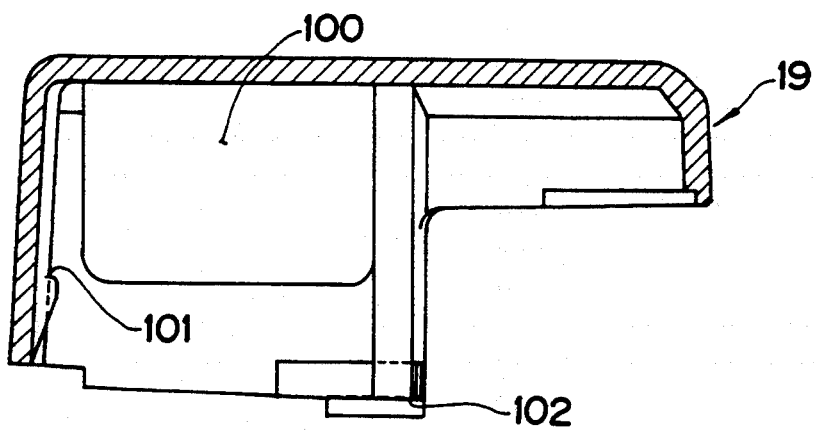
FIG. 26 is a longitudinal section of the adjuster cover.
Figure 27:
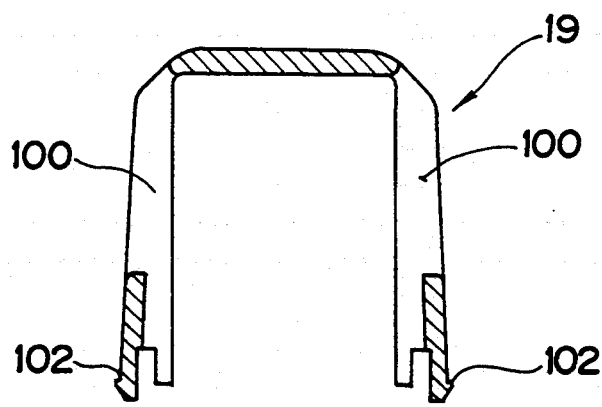
FIG. 27 is a section taken along line XXVII—XXVII of the adjuster cover as shown in FIG. 25.

An adjuster cover 19 as shown in FIGS. 25 to 27 is mounted on the slide garnish 13 of the slide adjuster assembled body 12. Operating window holes 100 are opened on the adjuster cover 19 to expose the button portion of the operation buttons 27a, 27b. The operation buttons 27a, 27b are operated by way of these windows 100.

Attaching projections 101, 102 are integrally formed toward the head and on the both sides of the adjuster cover 19, respectively, and an attaching window 103 and an attaching hole 104 for engaging these attaching window holes 101, 102 are formed on the slide garnish 13. Engaging grooves 105 for engaging the lower side portion of the adjuster cover 19 are provided on the face side of the slide garnish 13, and the adjuster cover 19 is caused to stably engage the slide garnish 13 as the lower end of the adjuster cover engages these engaging grooves.

Assembling sequence of the shoulder adjuster apparatus 10 will now be described.

Firstly, the latch means 16 is mounted on the slide garnish 13 which is made by molding a resin material such as polypropylene.

Figure 28:
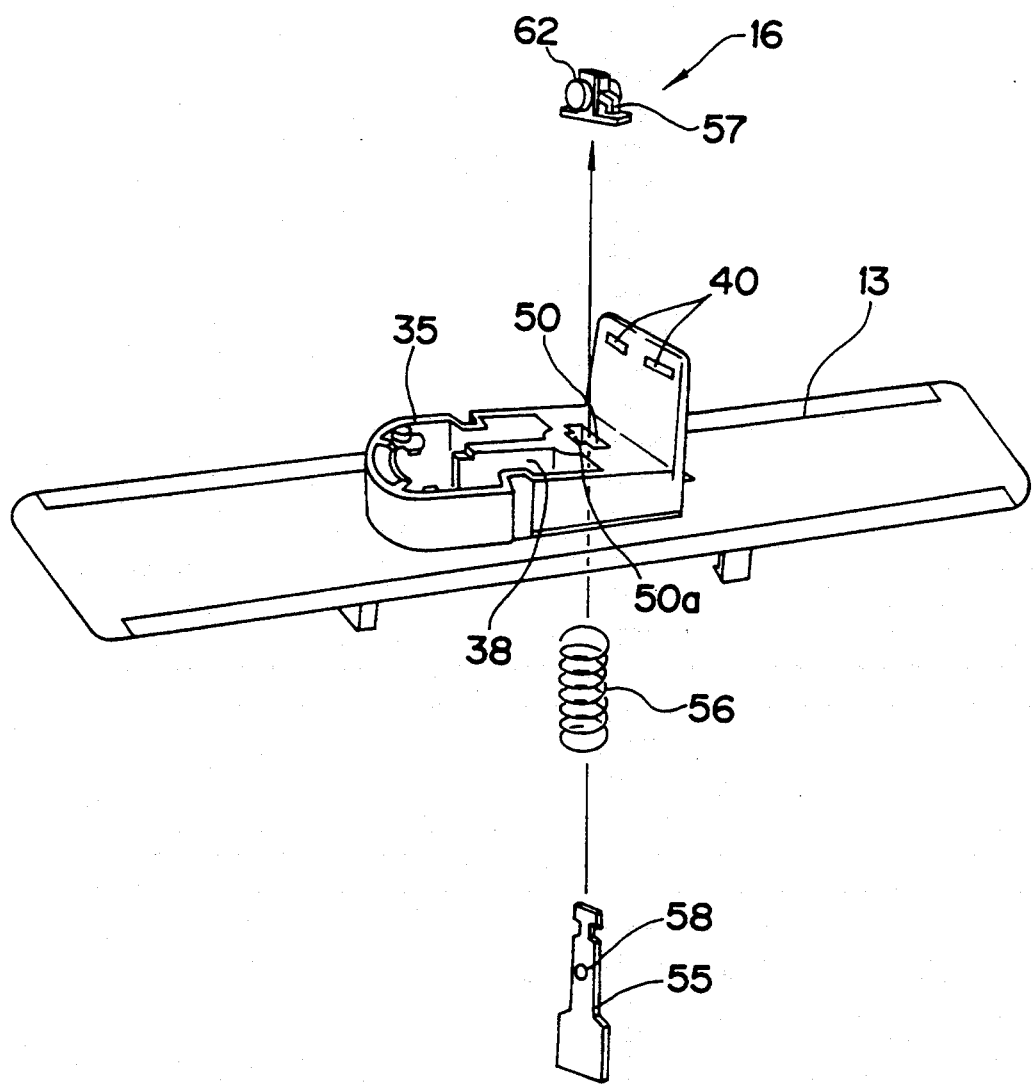
FIG. 28 is an exploded view showing the state of assembling the latch means to the slide garnish of the shoulder adjuster apparatus.
Figure 29:
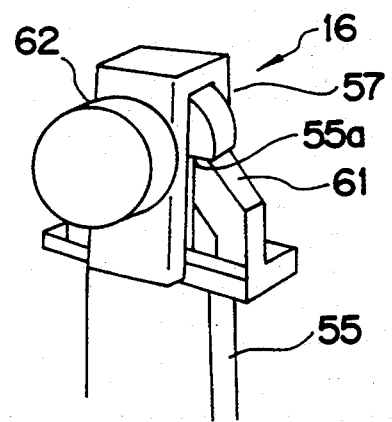
FIG. 29 is a view showing the state where a latch cap is mounted on a latch plate of the latch means.

The latch means 16 is mounted such that the latch plate 55 having the latch spring 56 wound thereon is inserted into the latch attaching hole 50 as shown in FIG. 28 from the reverse side of the slide garnish 13. The inserting of the latch plate 55 is positioned as its guide projection 58 is guided by the guide concave portion 50a of the latch attaching hole 50.

The inserted end of the latch plate 55 projects from the face side of the slide garnish 13 through the latch attaching hole 50, and such end is covered by the latch cap 57 to be attached and fixed thereat. When the latch cap 57 is attached, it is held as its lock claw 61 engages the jaw portion 55a of the latch plate 55. The latch plate 55 is thus attached to the slide garnish 13 and its pulling out from the slide garnish 13 is prevented.

Figure 30:
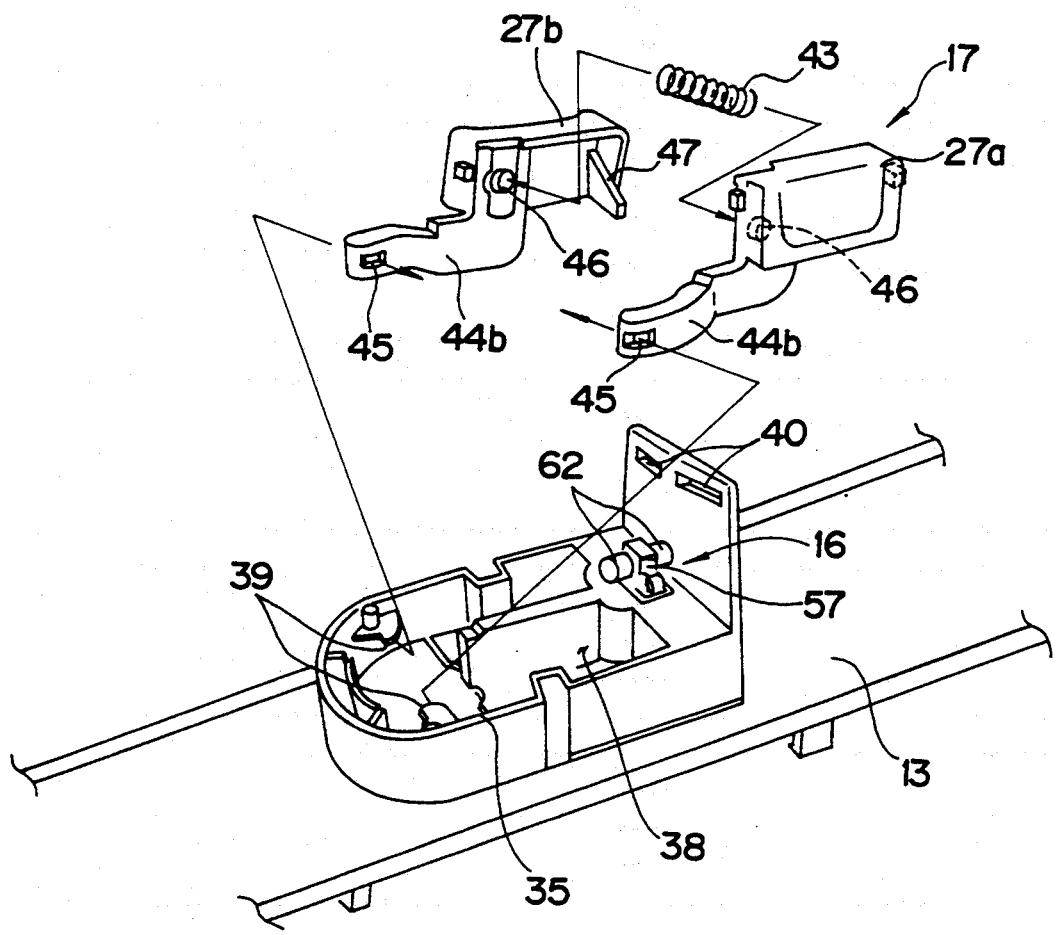
FIG. 30 is an exploded perspective view showing the state of assembling and operation mechanism to the face side of the slide garnish.

After attaching the latch means 16 to the slide garnish 13, the operation mechanism 17 is mounted, as shown in FIG. 30, on the button mounting portion formed on the face side of the slide garnish 13.

Firstly, in mounting of the operation mechanism 17, an operation button 37a or 37b is attached to the button attaching portion 35. This attaching is effected such that the guide projection 48 projecting from the head side of the operation button 37a (37b) is attached to the stroke guide hole 40 of the button mounting portion 35 in the state where the engaging hole 45 formed on the guide leg portion 44b of the operation button 37a (37b) is hooked on the guide projection 39 of the button mounting portion 35.

Thereafter, the return spring 43 is placed in the spring seat 46 of one of the operation buttons 37a (37b) which has been mounted on the button mounting portion 35. The mounting of the operation mechanism 17 is completed such that, while, in the state where the other end of the return spring 43 is engaged with the spring seat 46 of the other operation button 37a (37b), the engaging hole 45 formed on the guide leg portion 44b of the other operation button 37a (37b) is hooked on the guide projection 39 of the button mounting portion 35, the guide projection 39 of the head side of the operation button 37a (37b) is caused to engage the stroke guide hole 40 of the button mounting portion 35.

In the state where the operation mechanism 17 is attached to the button mounting portion 35 of the slide garnish 13, an opening for passing the anchor nut 51 of the webbing anchor means 18 is formed on the side of the guide leg portions 44b of the operation buttons 37a, 37b. Further, the taper guide portion 47 formed on the operation buttons 37a, 37b of the operation mechanism 17 is brought into its state where it may engage the knuckle pin 62 formed on the latch cap 57 of the latch means 16. The knuckle pin 62 has a cylindrical shape, and, since the taper guide portion 47 engages the cylindrical shape knuckle pin 62, the taper guide portion 47 may be caused to stably engage the knuckle pin 62 also by the operation of the operation buttons 37a, 37b.

Figure 31:
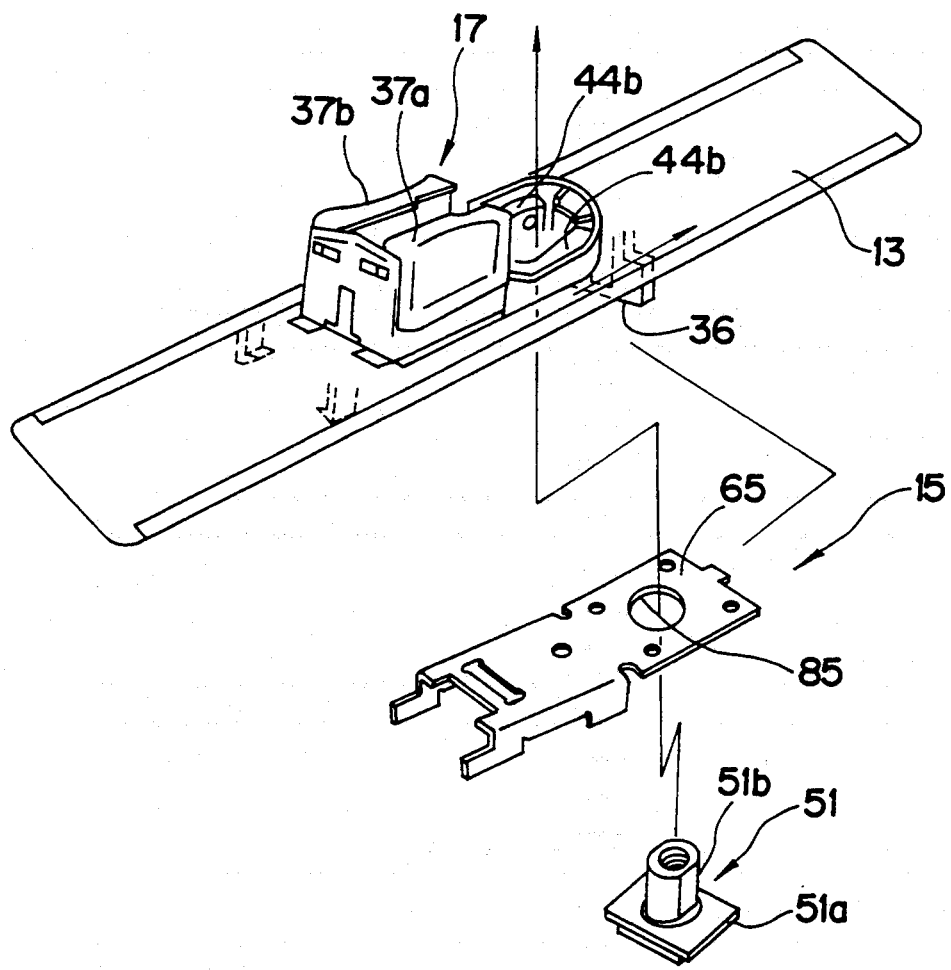
FIG. 31 is a view showing the state where a slide anchor base body of the slide assembly and an anchor nut of the webbing anchor means are assembled onto the slide garnish.

Next, as shown in FIG. 31, the slide anchor base 65 of the slide assembly 15 is set on the reverse side of the slide garnish 13. While such setting of the base body 65 is performed in a manner putting the latch plate 55 of the latch means 16 through its latch guide hole 77, the setting of the slide anchor base body 65 may be performed either after reversing the slide garnish or in the manner as it is as shown in FIG. 31.

After setting the slide anchor base body 65 on the assembly mounting portion 36 of the slide garnish 13, the cylindrical nut portion 51b of the anchor nut 51 having a flange thereon is inserted into the nut guide hole 85 of the slide anchor base body 65 to assemble the anchor nut 51.

Figure 32:
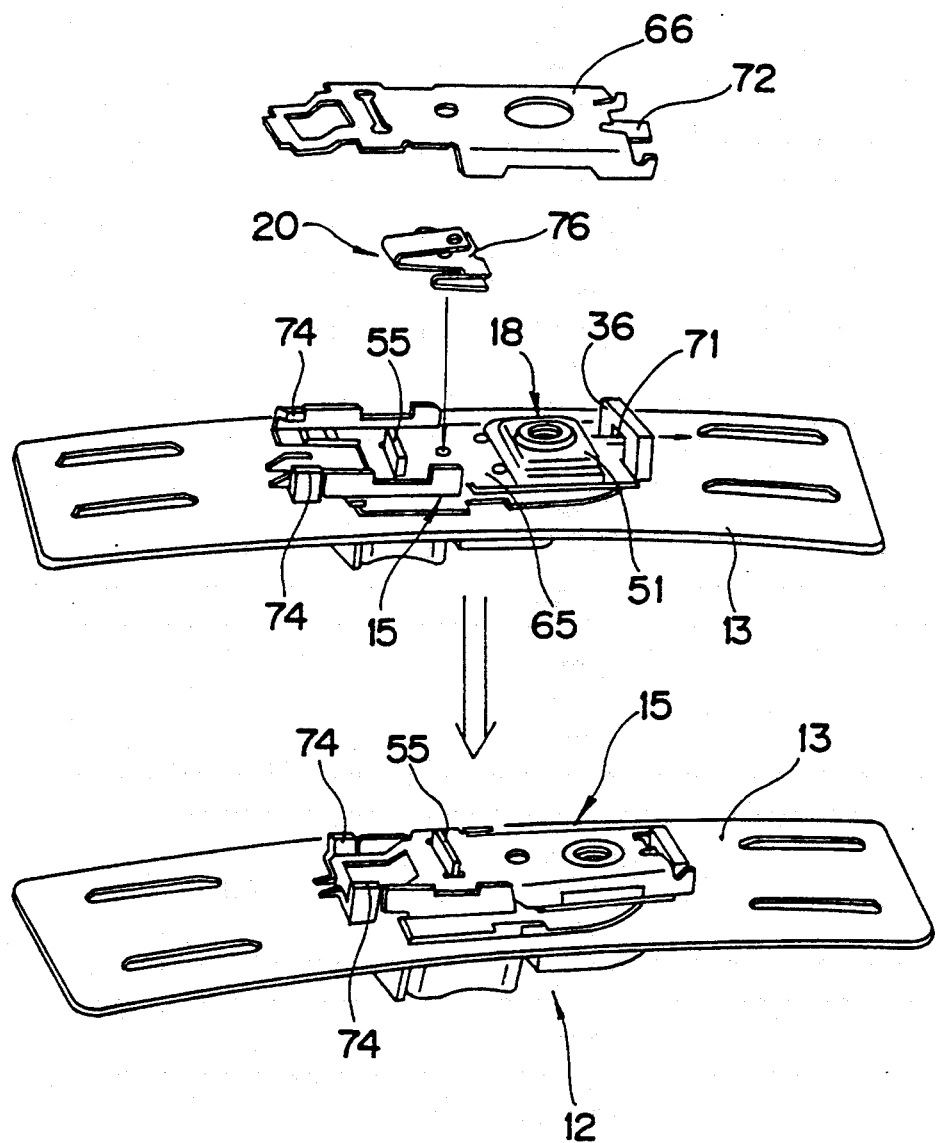
FIG. 32 is a view showing the respective states of the slide anchor cover body of the slide assembly and the spring plate of the slide positioning means being assembled and having been assembled onto the slide garnish.
Figure 33:
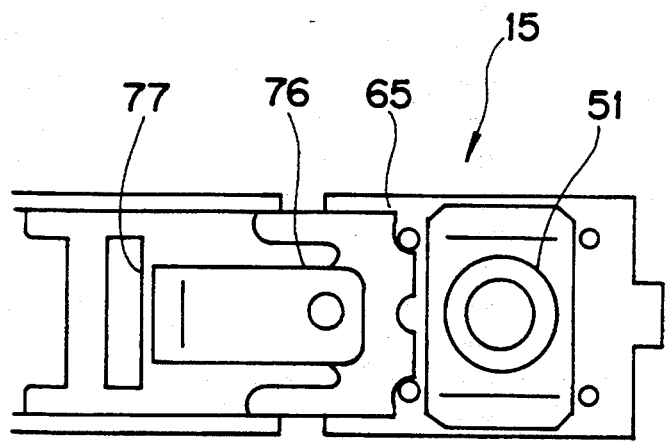
FIG. 33 is a view showing the relative position of the spring plate and the anchor nut to be mounted on the slide anchor base body of the slide assembly.

After assembling the anchor nut 51, the slide garnish 13 may be inverted as shown in FIG. 32. After inserting the anchor nut 51 into the slide garnish 13, the spring plate 76 of the slide positioning means 20 is placed and the spring plate 76 is positioned and set on the slide anchor base body 65 as shown in FIG. 33.

Figure 34:
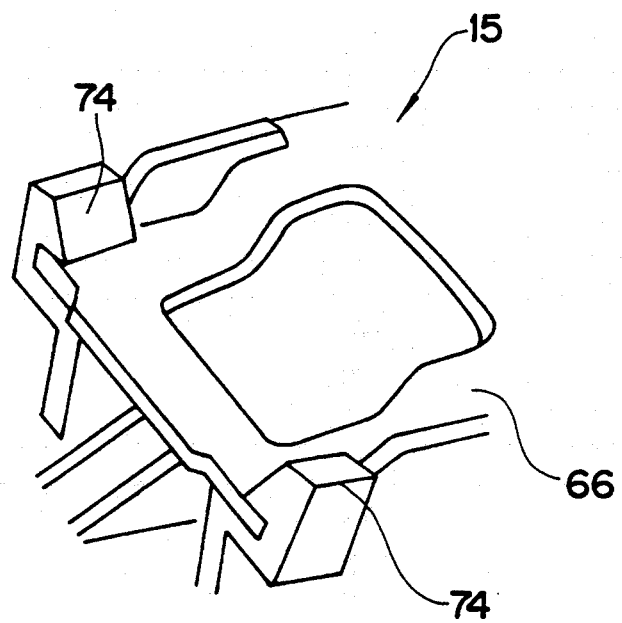
FIG. 34 is an enlarged partial view showing the state where the slide anchor cover plate of the slide assembly is attached to the slide garnish.

In this set state, the cover body 66 is caused to overlap the slide anchor base body 65. The slide anchor cover body 66 is caused to engage the holding window 71 of the slide garnish 13 at the holding projection 72 formed at one of the ends thereof, and the other end thereof is caused to engage, as shown in FIG. 34, the pair of holding claws 74 of the slide garnish 13, whereby the slide assembly 15 is mounted in a manner of just touching. It should be noted that the webbing anchor 80 is fastened to the anchor nut 51 of the webbing anchor means 18 by means of the anchor bolt 81.

As the slide assembly 15 is mounted onto the slide garnish 13, the slide assembly 15, the latch means 16, the operation mechanism 17, the webbing anchor 18 and the slide positioning means 20 are integrally assembled on the side of the slide garnish 13, whereby the slide adjuster assembled body 12 is constructed as an integrated slider. The slide adjuster assembled body 12 is constructed to have a curved shape corresponding to the curved shape of the adjuster rail 11.

Figure 35:
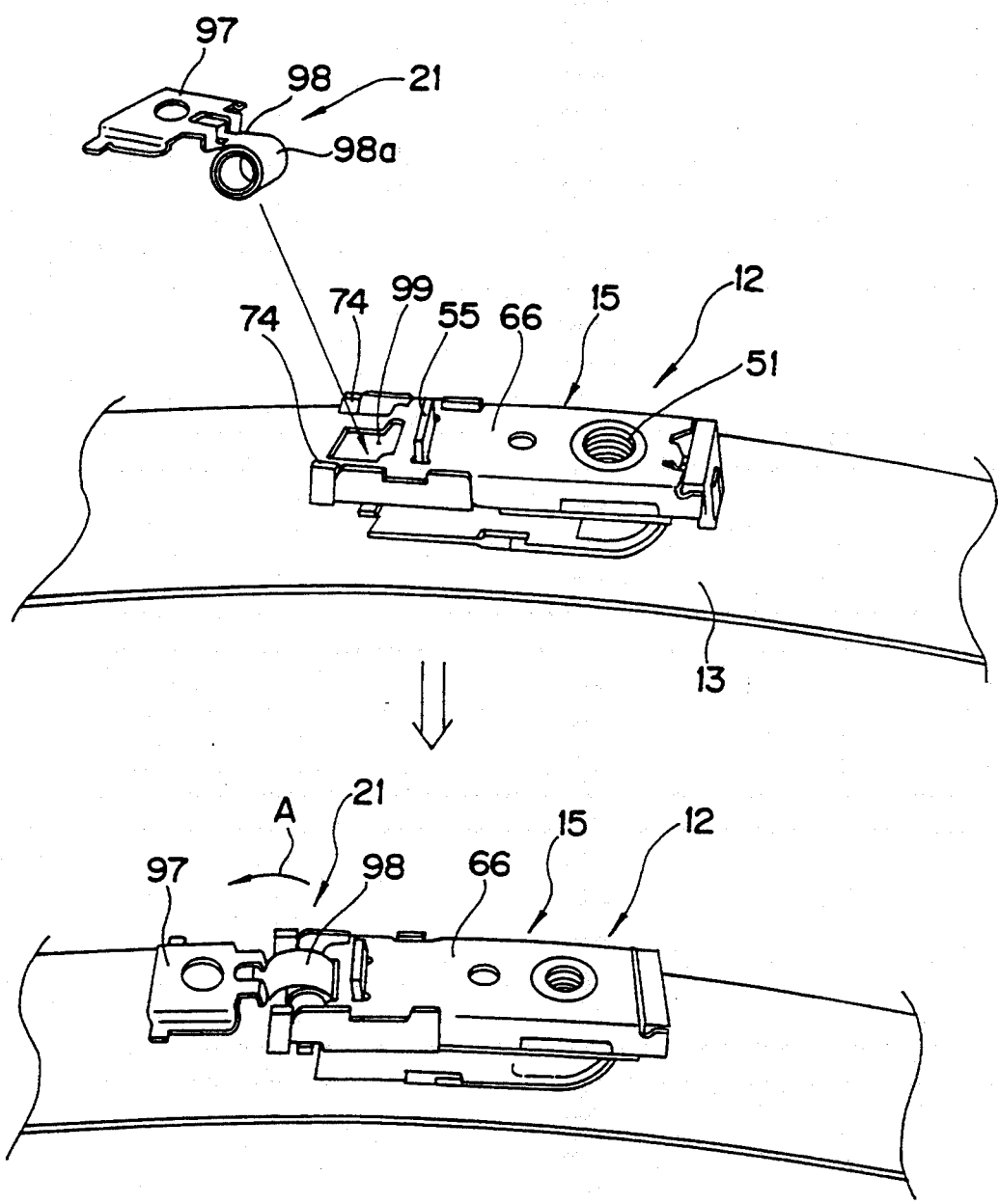
FIG. 35 is a perspective view showing the respective states of the slider support means before and after its assembling onto the slide adjuster assembled body.

Next, the slider support means 21 obtained by assembling the support plate 97 and the support spring 98 is mounted as shown in FIG. 35 onto the slide assembly 15 of the slide adjuster assembled body 12. The slider support means 21 is mounted onto the slide assembly 15 by means of the resiliency of the support spring 98 by inserting the spiral spring portion 98a of the support spring 98 into the spring receiving opening 99 of the slide assembly 15.

Figure 36:
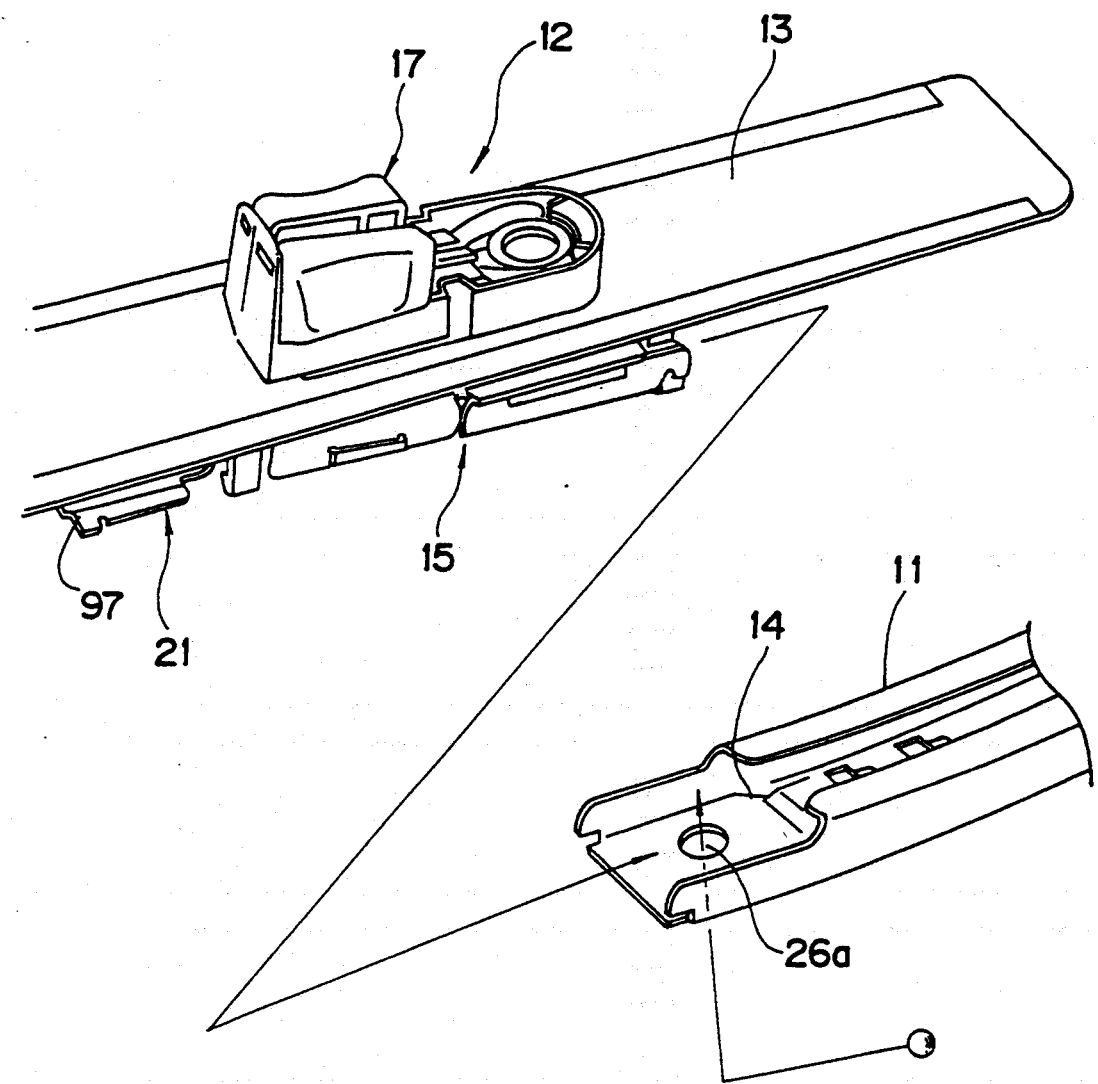
FIG. 36 is a perspective view showing the state of assembling the slide adjuster assembled body to the adjuster rail.
Figure 37:
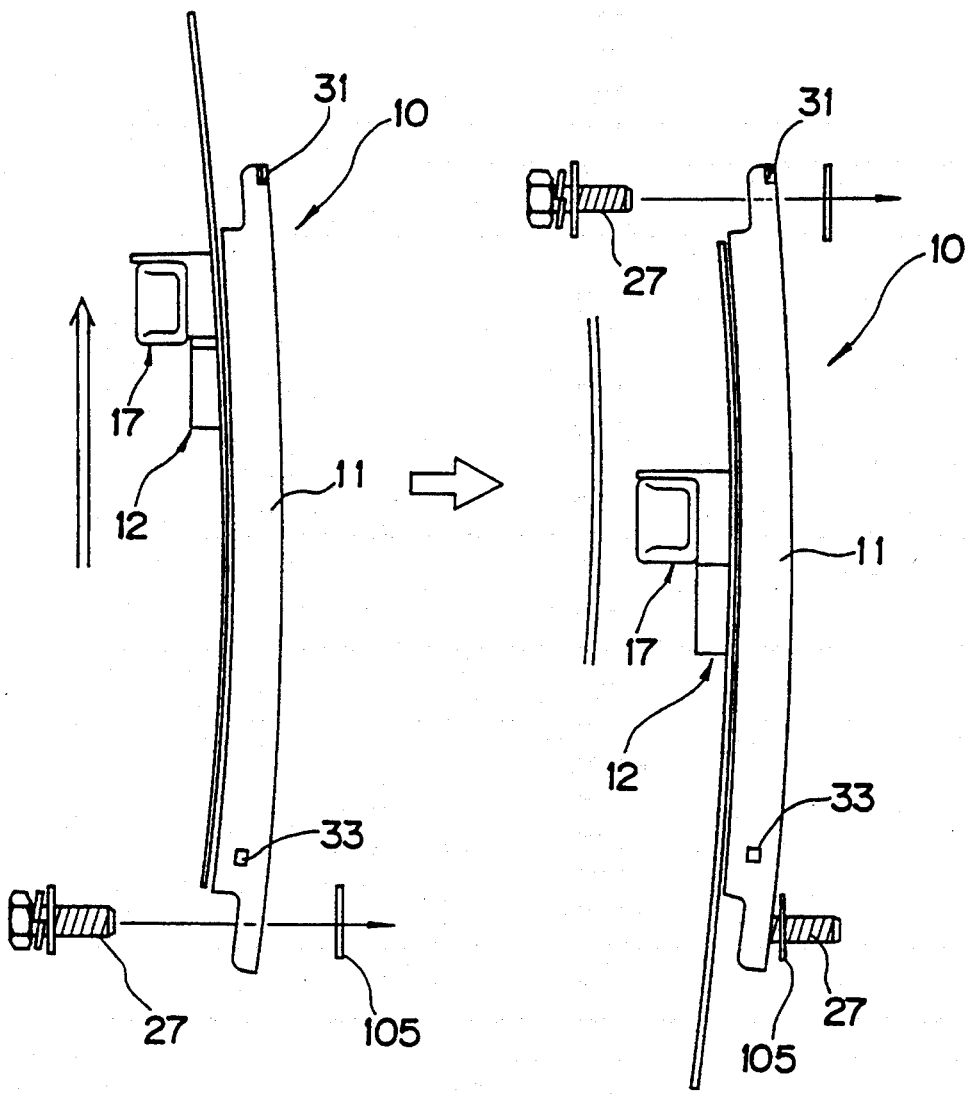
FIG. 37 is a view showing assembling means of fastening bolt to the adjuster rail on which the slide adjuster assembled body has been assembled.

After mounting the slider support means 21 onto the slide adjuster assembled body 12, the support plate 97 of the slider support means 21 is brought down as indicated by arrow A to the reverse side of the slide garnish 13. In this state, the slide adjuster assembled body 12 is inserted as shown in FIG. 36 into the guide route 14 of the adjuster rail 11 from one of the sides thereof.

In inserting the slide adjuster assembled body 12 into the guide route 14 of the adjuster rail 11, when the spring plate 76 of the slide positioning means 20 incorporated into the slide adjuster assembled body 12 has reached the position of the attaching hole 26a, the positioning ball 92 is inserted from the attaching hole 26a.

The operation buttons 37a, 37b of the operation mechanism 17 is operated to be pressed in the state where the positioning ball 92 is inserted to retract the latch plate 55 of the latch means 16. In the state where the latch plate 55 is retracted, the slide adjuster assembled body 12 is slid along the guide route 14 of the adjuster rail 11.

On the other hand, before pressing the slide adjuster assembled body 12 into the adjuster rail 11, the fastening bolt 27 serving as the fastening means may also be attached previously to the attaching hole 26b of the lower side, which has an engaging projection formed thereon, of the adjuster rail 11. The fastening bolt 27 is maintained in its attached state by a washer 105 having teeth thereon.

Thus, after attaching the fastening bolt 27 to one of the sides, i.e. lower side, of the adjuster rail 11, the slide adjuster assembled body 12 is pressed down until it engages the holding projection 33 of the adjuster rail 11. In this pressed down state, the fastening bolt 27 serving as the fastening means is mounted onto the other side (upper side) of the adjuster rail 11. Upon the mounting of the fastening bolt 27, the support plate 97 of the slider support means 21 is also mounted in a fixed manner to the adjuster rail 11 by the fastening bolt 27.

On the other hand, with the slider support means 21, even if the slide adjuster assembled body 12 is pressed down to its lowest position, the ear-like portions of the support plate 97 engage the engaging grooves 31 of the adjuster rail 11. The slider support means 21 is thus stably assembled with the adjuster rail 11 and an attaching error may be prevented.

In the manner as described, the shoulder adjuster apparatus 10 is constructed, and the adjuster cover 19 is mounted on the shoulder adjuster apparatus 10 to provide a cover. The assembled shoulder adjuster apparatus 10 is subsequently subjected to visual inspection and performance inspection. For the performance inspection, the operation of the operation mechanism 17 is repeated to check whether the shoulder adjuster apparatus 10 operates normally. The adjuster cover 19 may be mounted after these inspections.

As has been described above, in a shoulder adjuster apparatus and the assembling method thereof according to the present invention, since the adjuster rail is formed into a curved shape along the attaching portion of the body of an automobile, it may be stably attached to the attaching portion of the body. On the other hand, since the slide adjuster assembled body is constructed by integrally mounting a slide assembly, latch means, an operation mechanism and webbing anchor means onto the side of a slide garnish, assembling of the component parts of the shoulder adjuster apparatus may be performed smoothly and without interruption. Automated assembling is thus possible and a reduction in costs may be achieved.

This shoulder adjuster apparatus may be assembled such that, after integrally constructing the slide adjuster assembled body, the slide adjuster assembled body is assembled onto the adjuster rail from one of the sides thereof. Thus, assembling characteristic is improved and assembling of the shoulder adjuster apparatus may be performed in a short time period smoothly and without interruption.

The slide assembly to be incorporated into the shoulder adjuster apparatus may be attached to a slide garnish in the state where a slide anchor base body and a cover body overlap each other, and a flange portion of an anchor nut is sandwiched between the slide anchor base body and the cover body. As it is possible to stably fix the webbing anchor means, the assembling characteristic is improved and the attaching strength of the webbing anchor means may be improved.

Further, the latch means is attached to the slide garnish where a conventional latch plate having teeth is separated into a simple-shaped latch plate and a latch cap made of a resin material. The assembling characteristic of the latch means is improved and such machining as pressing of the latch plate becomes easy to improve its workability. In addition, since, because of the resin made latch cap, a knuckle pin is designed to engage the taper guide of the resin-made operation button, there occurs a smooth engagement between resins to obtain a favorable operability of the operation mechanism.

Furthermore, because of the operation mechanism, the shape of a conventional operation button is changed to have a guide leg integrally formed thereon. Such guide leg engages an anchor nut of the webbing anchor means to be guided by where such engaging portion serves as the supporting point. The operability and operating feeling of the operation button may thus be improved. Since the operation mechanism may independently be attached to and held on the face side of the slide garnish, assembling characteristic thereof may be improved. Further, since an independent guide member for guiding the operation button is made unnecessary, the number of component parts is reduced correspondingly whereby a reduction in costs may be achieved.

Moreover, the slider support means is constituted by two component parts consisting of the support plate and the support spring and an ear-like portion of the support plate is to be supported on the upper end engaging groove of the adjuster rail. When a slide adjuster assembled body is assembled onto the adjuster rail, the ear-like portion of the support plate automatically engages the engaging groove of the adjuster rail to be set at the required position. Since the support spring is not attached directly to the adjuster rail in a conventional manner, the assembling characteristic thereof is improved and processing of the slider support means is easier, whereby a reduction in costs may be achieved.

On the other hand, the slide positioning means has a spring plate and this spring plate is sandwiched between a slide anchor base body of the slide assembly and a cover body thereof. The spring plate is thus stably positioned and set on the slide anchor base body when it is to be accommodated. Assembling characteristic of the spring plate is improved.

What is claimed is:

1. A shoulder adjuster apparatus to be attached to an attaching portion of a body of a vehicle, comprising:
   an adjuster rail means to be attached to and along the attaching portion of the vehicle body;
   a slide garnish for covering a front surface side of the adjuster rail means, the slide garnish having an engaging claw and a latching window; and
   an integrated slide adjuster assembled body assembled on a side of the slide garnish comprising a slide assembly accommodated slidably in a guide route formed within the adjuster rail means, said slide assembly comprising a slide anchor base body provided on a back surface side of the slide garnish and a slide anchor cover body overlapping the slide anchor base body, the slide anchor cover body being engagable with the engaging claw and latching window to fix the slide assembly to the slide garnish, latch means for causing the slide assembly to be detachably latched at a predetermined position of the adjuster rail means, an operation mechanism for releasing the latch means from a latched state, and webbing anchor means fixed on the slide assembly for supporting a webbing;
   wherein said adjuster rail means includes a rail and slider support means for elastically supporting the slide assembly upwardly in an installed state, said slider support means and said rail being fastened together to the attaching portion of the vehicle body, said slider support means including a support plate engageable with the rail of the adjuster rail means and a support spring detachably supported by the support plate, said rail comprising a bottom rail portion attachable to the attaching portion of the vehicle body and a side rail portion provided at its end portion with an engaging notch, and said support plate having an ear-like portion engageable with the engaging notch of the side rail portion of the rail.

2. A shoulder adjuster apparatus according to claim 1, wherein said slide assembly has an opening to which the support spring is mounted.

3. A shoulder adjuster apparatus according to claim 1, wherein said adjuster rail means is provided with a lock hole and said slide assembly is provided with a slide positioning means comprising a spring plate accommodated in the slide assembly in a positioned state and a positioning ball pressed towards the adjuster rail means side by means of spring force of the spring plate, said slide assembly being positioned by engagement of the positioning ball with the lock hold of the adjuster rail means.

4. A shoulder adjuster apparatus according to claim 1, wherein the adjuster rail means has a back side surface to be attached to the attaching portion of the vehicle body, said back side surface having a curved shape corresponding to a shape of the attached portion of the vehicle body.

5. A shoulder adjuster apparatus to be attached to an attaching portion of a body of a vehicle, comprising:

adjuster rail means attachable to and along the attaching portion of the vehicle body;

a slide garnish for covering a front surface side of the adjuster rail means, the slide garnish having an engaging claw and a latching window; and an integrated slide adjuster assembled body assembled on a side of the slide garnish comprising a slide assembly accommodated slidably in a guide route formed within the adjuster rail means, said slide assembly comprising a slide anchor base body provided on a back surface side of the slide garnish and a slide anchor cover body overlapping the slide anchor base body, the slide anchor cover body being engagable with the engaging claw and latching window to fix the slide assembly to the slide garnish, latch means for causing the slide assembly to be detachably latched at a predetermined position of the adjuster rail means, an operation mechanism for releasing the latch means from a latched state, and webbing anchor means fixed on the slide assembly for supporting a webbing, wherein said webbing anchor means includes an anchor nut with a flange sandwiched between the slide anchor base body and the slide anchor cover body of the slide assembly and said webbing anchor means further includes a webbing anchor fastenable to the anchor nut by means of an anchor bolt to attach the webbing.

6. A shoulder adjuster apparatus to be attached to an attaching portion of a body of a vehicle, comprising:

adjuster rail means attachable to and along the attaching portion of the vehicle body;

a slide garnish for covering a front surface side of the adjuster rail means, the slide garnish having an engaging claw and a latching window; and an integrated slide adjuster assembled body assembled on a side of the slide garnish comprising a slide assembly accommodated slidably in a guide route formed within the adjuster rail means, said slide assembly comprising a slide anchor base body provided on a back surface side of the slide garnish and a slide anchor cover body overlapping the slide anchor base body, the slide anchor cover body being engagable with the engaging claw and latching window to fix the slide assembly to the slide garnish, latch means for causing the slide assembly to be detachably latched at a predetermined position of the adjuster rail means, an operation mechanism for releasing the latch means from a latched state, and webbing anchor means fixed on the slide assembly for supporting a webbing;

wherein said adjuster rail means has a lock hole; and wherein said latch means comprises a latch plate engagable with the lock hole of the adjuster rail means, a latch spring for urging the latch plate toward the adjuster rail means and a latch cap for mounting the latch plate to the slide garnish, the latch cap being formed of a resin material and being integrally formed with a knuckle pin engagable with the operation mechanism.

7. A shoulder adjuster apparatus according to claim 6, wherein the operation mechanism has a taper guide engagable with the knuckle pin of the latch cap.

8. A shoulder adjuster apparatus according to claim 7, wherein said operation mechanism comprises a pair of operation buttons mounted on a face side of the slide garnish and a return spring for urging the operation buttons toward their original positions, the operation buttons integrally having the taper guide to be engaged with the knuckle pin of the latch cap of the latch means and a guide leg to be engaged with the anchor nut of the webbing anchor means, said guide leg being pivotal about an engaged portion of the guide leg and the anchor nut, said latch plate of the latch means being retracted from the lock hole against the spring force of the return spring.

9. A shoulder adjuster apparatus according to claim 8, wherein said operation buttons are made of a resin material.

10. A method of assembling a shoulder adjuster apparatus which is attached to an attaching portion of a vehicle body and which comprises adjuster rail means provided with a guide route, a slide garnish provided with a latch hole, latch means, an operation mechanism provided with operation buttons, a slide assembly provided with a slide anchor base body and a slide anchor cover body, and webbing anchor means provided with a flanged anchor nut, said assembling method comprising the steps of:

mounting the latch means into the latch hole of the slide garnish;

attaching the operation mechanism to a face side of the slide garnish;

setting the slide anchor base body to a back surface of the slide garnish;

assembling the anchor nut with the slide anchor base body;

overlapping the slide anchor cover body in an assembled state with the anchor nut to engage the slide cover body at an assembly mounting portion on the back surface side of the slide garnish so that the anchor nut is assembled onto the slide assembly in a state where the slide anchor base body is set on the back surface side of the slide garnish with the slide anchor cover body overlapping the slide anchor base body to fix the slide assembly to the back surface;

inserting the slide assembly into the guide route of the adjuster rail means from one side thereof to assemble the slide assembly with the adjuster rail means as a slide adjuster assembled body; and mounting the slide adjuster assembled body to the attaching portion of the vehicle body.

11. An assembling method according to claim 10, wherein the latch means is mounted on the slide garnish by inserting a latch plate having a latch spring mounted thereon into the latch guide hold of the slide garnish from the back surface side thereof and by holding an inserted end of the latch plate from the face surface side of the slide garnish by means of a latch cap.

12. An assembling method according to claim 10, wherein a support spring of slider support means is mounted on a spring receiving opening of the slide assembly before assembling the slide adjuster body with the adjuster rail means and when the slide adjuster assembled body is assembled with the adjuster rail means, the assembly support means is caused to engage an engaging notch of the adjuster rail means and is fixed to the adjuster rail means.

* * * * *